US012523874B2

(12) United States Patent
Yokoyama

(10) Patent No.: US 12,523,874 B2
(45) Date of Patent: Jan. 13, 2026

(54) VIRTUAL IMAGE DISPLAY APPARATUS

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 604 days.

(21) Appl. No.: 17/955,552

(22) Filed: Sep. 29, 2022

(65) Prior Publication Data

US 2023/0094824 A1   Mar. 30, 2023

(30) Foreign Application Priority Data

Sep. 30, 2021   (JP) .................... 2021-160805

(51) Int. Cl.
*G02B 27/01*   (2006.01)
*G02B 5/18*    (2006.01)
*G02B 27/00*   (2006.01)

(52) U.S. Cl.
CPC ....... *G02B 27/0172* (2013.01); *G02B 5/1842* (2013.01); *G02B 27/0081* (2013.01); *G02B 2027/0125* (2013.01)

(58) Field of Classification Search
CPC .............. G02B 27/0172; G02B 5/1842; G02B 27/0081; G02B 2027/0125; G02B 2027/0178; G02B 5/18; G02B 27/00; G02B 2027/01; G02B 5/1847; G02B 5/188; G02B 2005/1804; G02B 5/1814; G02B 5/1861; G02B 5/1866; G02B 5/1871; G02B 27/4272; G02B 27/01–2027/0198; G02B 5/1876

USPC ............. 359/521, 13–14, 629–633, 558–576
See application file for complete search history.

(56) References Cited

U.S. PATENT DOCUMENTS

| | | | |
|---|---|---|---|
| 10,191,288 B2 | 1/2019 | Singer et al. | |
| 10,520,733 B2 | 12/2019 | Takeda et al. | |
| 11,156,832 B1 * | 10/2021 | Keith | G02B 6/0033 |
| 11,199,712 B2 | 12/2021 | Takeda et al. | |
| 2010/0296163 A1 * | 11/2010 | Saarikko | G02B 5/1814 |
| | | | 359/569 |

(Continued)

FOREIGN PATENT DOCUMENTS

| | | |
|---|---|---|
| JP | 2018054978 | 4/2018 |
| JP | 2020519955 | 7/2020 |
| WO | 2018206848 | 11/2018 |

*Primary Examiner* — Thomas K Pham
*Assistant Examiner* — Kuei-Jen L Edenfield
(74) *Attorney, Agent, or Firm* — JCIPRNET

(57) ABSTRACT

In a virtual image display apparatus, as viewed from an exit pupil, a first emission diffraction grating and a second emission diffraction grating overlap, and a region, of the first emission diffraction grating, emitting first image light is different from a region, of the second emission diffraction grating, emitting second image light. As a result, an optical path from the first display element to the first emission diffraction grating can be prevented from being largely different from an optical path from a second display element to the second emission diffraction grating. Thus, unevenness in luminance in a virtual image displayed due to an increased difference in luminance between the first image light emitted from the first emission diffraction grating and the second image light emitted from the second emission diffraction grating can be suppressed.

14 Claims, 15 Drawing Sheets

(56) References Cited

U.S. PATENT DOCUMENTS

| | | |
|---|---|---|
| 2011/0019258 A1 | 1/2011 | Levola |
| 2014/0218801 A1 | 8/2014 | Simmonds et al. |
| 2018/0095283 A1 | 4/2018 | Takeda et al. |
| 2020/0049999 A1 | 2/2020 | Takeda et al. |
| 2020/0081246 A1* | 3/2020 | Olkkonen .......... G02B 27/0081 |
| 2020/0278547 A1* | 9/2020 | Singer ................ G02B 27/4272 |
| 2023/0213767 A1* | 7/2023 | Grant .................... G02B 6/005 |
| | | 345/8 |

* cited by examiner

VIRTUAL IMAGE DISPLAY APPARATUS

The present application is based on, and claims priority from JP Application Serial Number 2021-160805, filed Sep. 30, 2021, the disclosure of which is hereby incorporated by reference herein in its entirety.

BACKGROUND

1. Technical Field

The present disclosure relates to a virtual image display apparatus that enables observation of a virtual image, and more particularly to a virtual image display apparatus of a type that utilizes diffraction and light guide.

2. Related Art

A known HMD enabling observation of a virtual image has a light guide plate, with a surface having a diffraction element formed thereon, incorporated to achieve a thinner optical system (U.S. Pat. No. 10,191,288). Regarding this HMD optical system, a technique of dividing an angle of view into sides along a direction in which the eyes are arranged side by side (see FIG. 9 and FIG. 22) has been disclosed. This is achieved using input coupling elements 308a to 308c and output coupling elements 310a to 310c provided to optical waveguides 306a to 306c.

The HMD optical system disclosed in U.S. Pat. No. 10,191,288 described above involves a risk that luminance may be uneven between a region corresponding to the left side of the angle of view and a region corresponding to the right side of the angle of view, and this may involve a large difference in luminance. For example, as illustrated in FIG. 22 in U.S. Pat. No. 10,191,288, in the output coupling elements 310a and 310c, the light incident on the input coupling elements 308a and 308c is emitted to an appropriate position, through sequential diffraction from a closer side to a farther side relative to the input coupling elements 308a and 308c. In the output coupling elements 310a and 310c, the light diffracted on the farther side relative to the input coupling elements 308a and 308c is subject to diffraction the number of times of which is larger than that for the light diffracted on the closer side relative to the input coupling elements 308a and 308c, resulting in a lower luminance. Thus, unevenness in luminance may occur with a large difference in luminance between the light emitted from the optical waveguide 306c corresponding to the angle of view on the left side far from the input coupling element 308c and light emitted from the optical waveguide 306a corresponding to the angle of view on the right side close the input coupling element 308a.

SUMMARY

A virtual image display apparatus according to an aspect of the present disclosure includes: a first display element that emits a first image light; a second display element that emits a second image light; a first optical member that includes: a first incident diffraction grating on which the first image light from the first display element is incident; a first emission diffraction grating having a first region that emits the first image light toward a position where an exit pupil is formed; and a first pupil enlargement grating diffracting the first image light from the first incident diffraction grating toward the first emission diffraction grating; and a second optical member that includes: a second incident diffraction grating on which the second image light from the second display element is incident; a second emission diffraction grating having a second region that emits the second image light toward the position where the exit pupil is formed; and a second pupil enlargement grating diffracting the second image light from the second incident diffraction grating toward the second emission diffraction grating, wherein as viewed from the exit pupil, the first emission diffraction grating overlaps with the second emission diffraction grating, and as viewed from the exit pupil, the first region of the first emission diffraction grating is different from the second region of the second emission diffraction grating.

DESCRIPTION OF EXEMPLARY EMBODIMENTS

First Exemplary Embodiment

A virtual image display apparatus according to a first exemplary embodiment of the present disclosure will be described below in detail with reference to FIG. 1 and the like.

Figure 1:
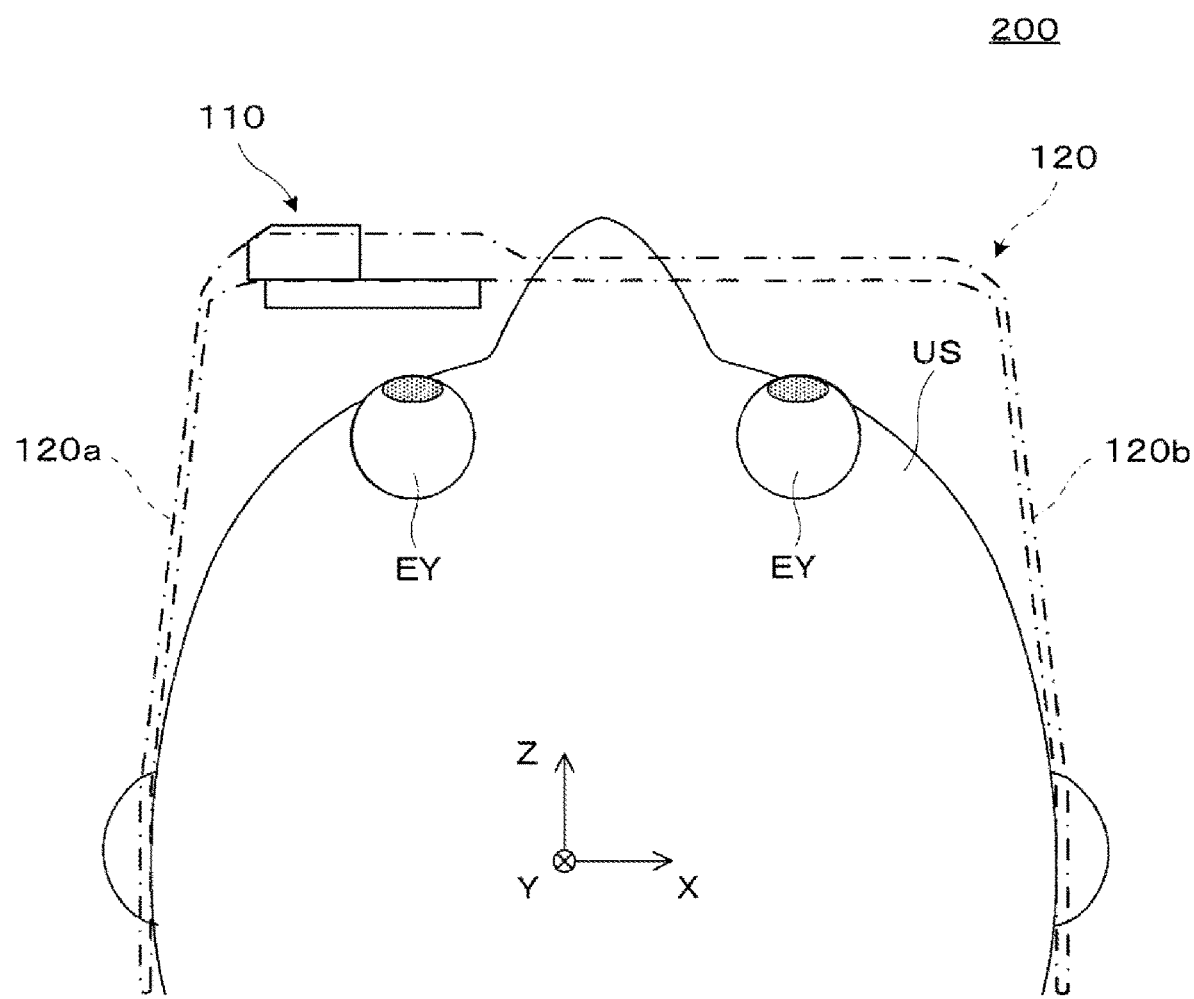
FIG. 1 is a plan view illustrating a mounted state of an HMD incorporating a virtual image display apparatus.

FIG. 1 is a diagram showing a mounted state of a head-mounted display (hereinafter, also referred to as "HMD") 200, and the HMD 200 allows an observer or wearer US who is wearing the HMD 200 to be able to recognize an image as a virtual image. In FIG. 1 and the like, X, Y, and Z are an orthogonal coordinate system, a +X direction corresponds to a lateral direction in which the two eyes EY of an observer or wearer US who is wearing the HMD 200 or a virtual image display apparatus 110 are disposed, a +Y direction corresponds to an downward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction.

The HMD 200 includes the virtual image display apparatus 110 for the left eye, and a support device 120 including a pair of temples 120a and 120b and supporting the virtual image display apparatus 110. The virtual image display apparatus 110 is disposed to cover the front side, that is, the +Z side of one of the eye EY of the wearer US.

Figure 2:
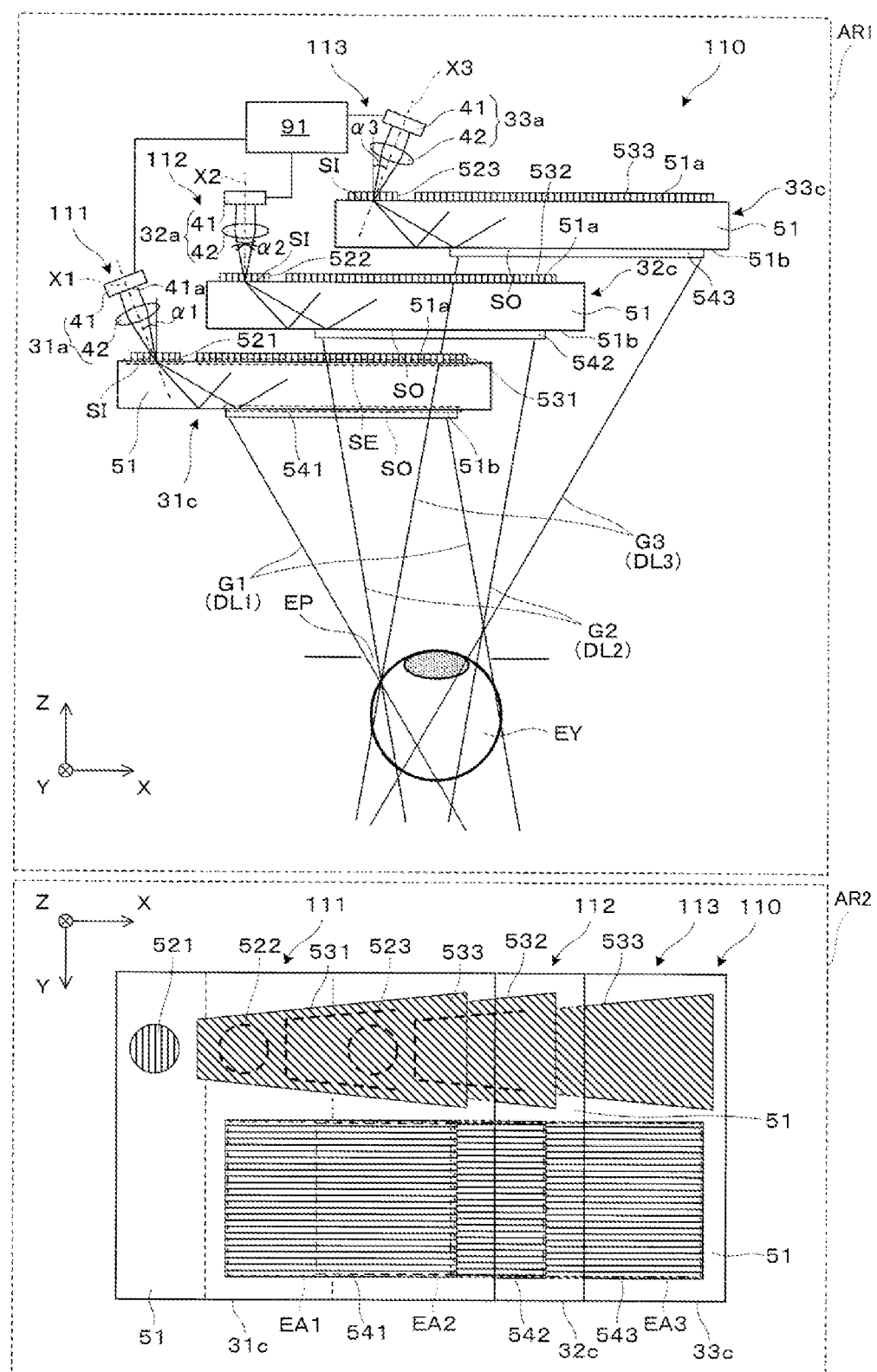
FIG. 2 is a plan view and a back view of a virtual image display apparatus according to a first exemplary embodiment.
Figure 3:
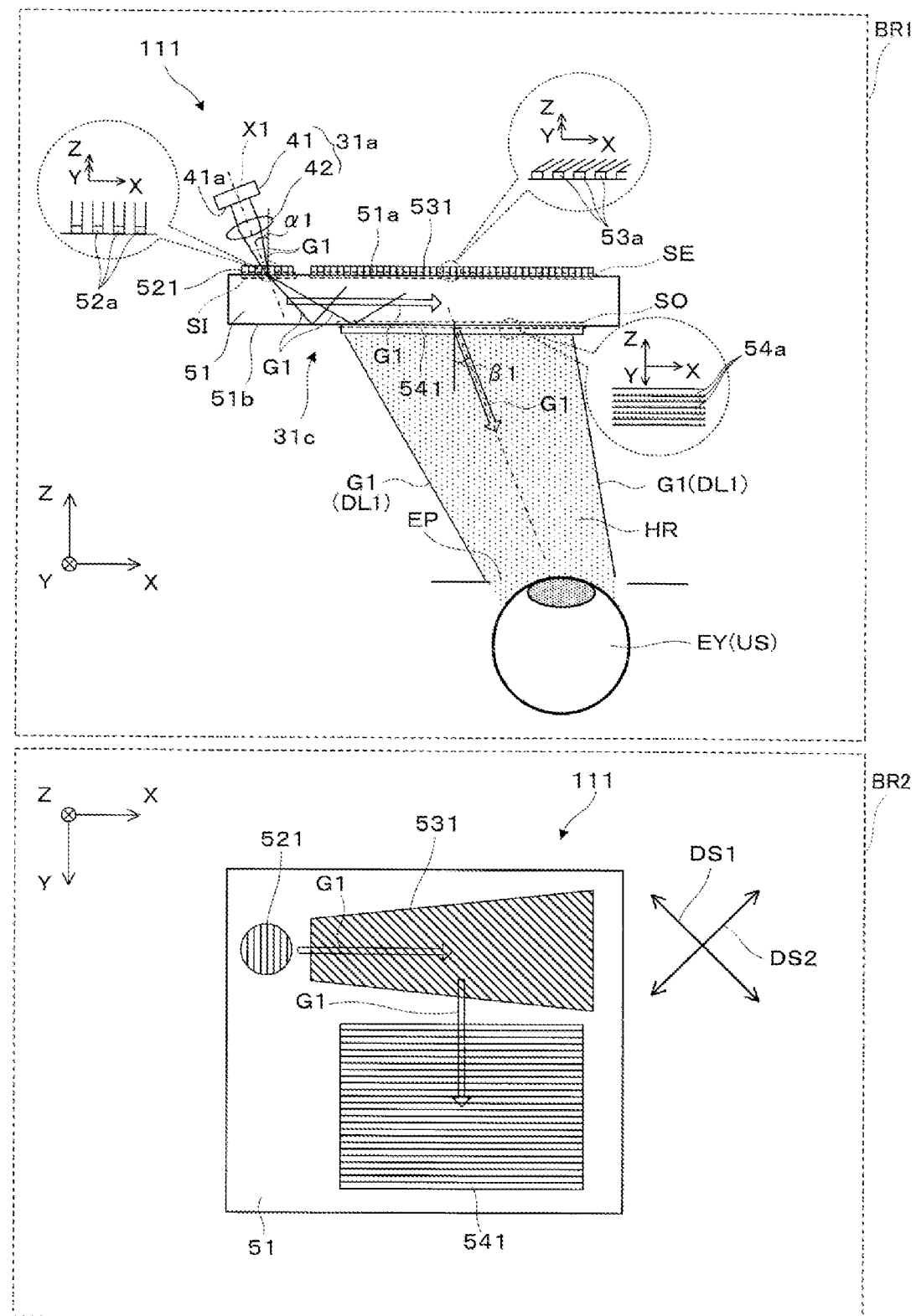
FIG. 3 is a plan view and a back view of a first optical device forming the virtual image display apparatus.
Figure 4:
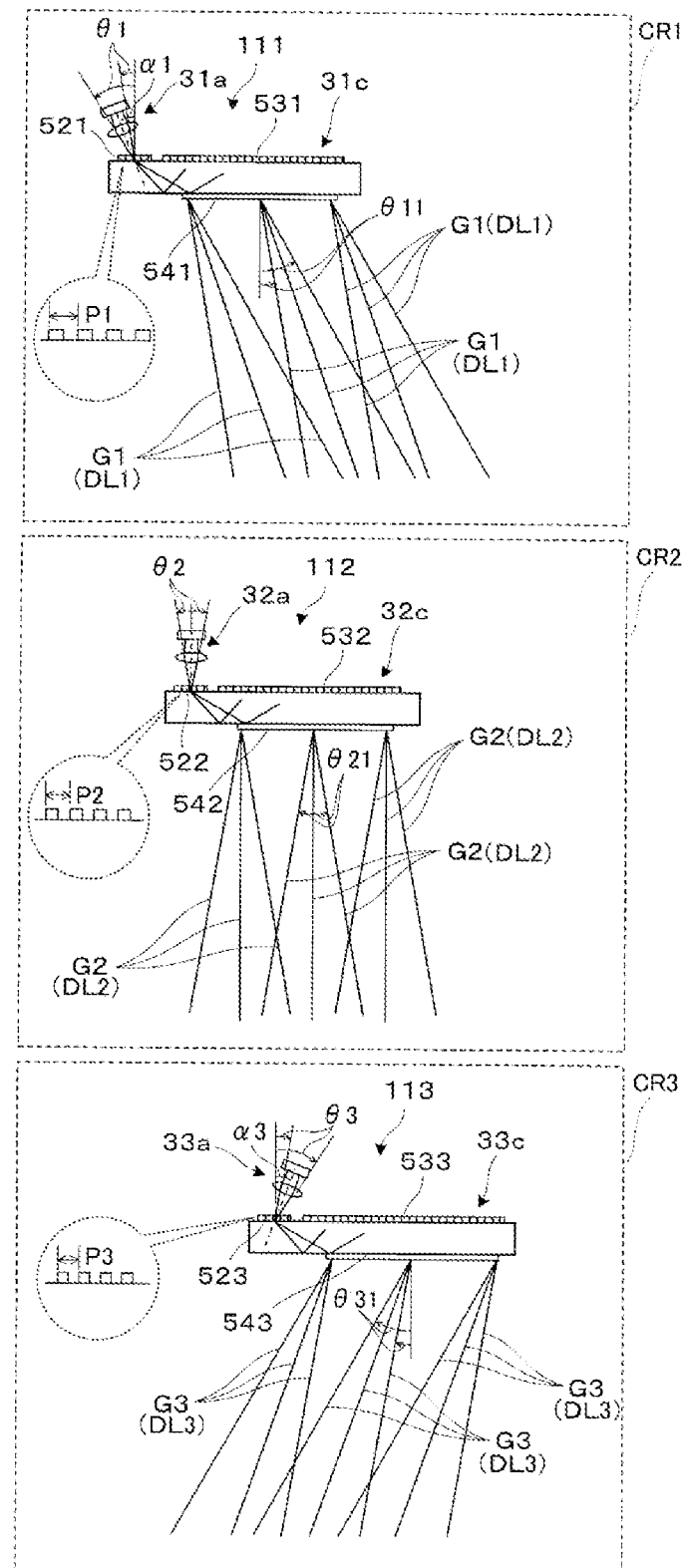
FIG. 4 is a diagram illustrating image formation by each optical device.

The virtual image display apparatus 110 will be described with reference to FIG. 2 to FIG. 4. In FIG. 2, a region AR1 is a plan view of the virtual image display apparatus 110, and a region AR2 is a back view of the virtual image display apparatus 110. In FIG. 3, a region BR1 is a plan view of a first optical device 111, and a region BR2 is a back view of the first optical device 111. In FIG. 4, a region CR1 is for explaining image formation by the first optical device 111, a region CR2 is for explaining image formation by a second optical device 112, and a region CR3 is for explaining image formation by a third optical device 113.

The virtual image display apparatus 110 illustrated in FIG. 2 includes the first optical device 111, the second optical device 112, the third optical device 113, and a drive control device 91. The virtual image display apparatus 110 has a structure in which the first optical device 111, the second optical device 112, and the third optical device 113 are arranged so as to overlap each other in the Z direction which is the front and back direction, while being shifted from each other in the X direction which is the lateral direction. The first optical device 111 is in charge of displaying a virtual image on the left side, that is, in a −X side angle of view region. The second optical device 112 is in charge of displaying a virtual image in a center angle of view region in the left and right direction. The third optical device 113 is in charge of displaying a virtual image on the right side, that is, in a +X side angle of view region. The virtual images displayed by the first optical device 111, the second optical device 112, and the third optical device 113 are joined together to enable observation of the entire image. Note that the optical devices 111 to 113 transmit external light, and thus the virtual image display apparatus 110 can display the virtual image with an image of the outside world serving as the background. Thus, the virtual image display apparatus 110 is a see-through type virtual image display apparatus.

With reference to FIG. 3, the first optical device 111 includes a first display element 31a that emits first image light G1 and a first optical member 31c that emits the first image light G1 as display light DL1. The first display element 31a includes a display panel 41 and a collimator lens 42. The first optical member 31c includes a light guide member 51, a first incident diffraction element 521, a first pupil enlargement grating 531, and a first emission diffraction grating 541. The first optical member 31c guides a virtual image to the wearer US by guiding the first image light G1 generated by the first display element 31a to the eye EY of the wearer US.

In the first display element 31a, the display panel 41 is a display device that emits the first image light G1 to form an image corresponding to the virtual image. Specifically, the first display element 31a is a display using, for example, an organic electro-luminescence (organic EL), an inorganic EL, or an LED array, and forms a still image or a moving image in color on a two-dimensional display surface 41a. The display panel 41 is not limited to a spontaneous light emission type image light generation device. Thus, the display panel 41 may include an LCD and another light modulation element, and may form an image by illuminating the light modulation element with a light source such as a backlight. As the display panel 41, a liquid crystal on silicon (LCOS) (LCOS is a registered trademark), a digital micromirror device, and the like may be used instead of the LCD.

The collimator lens 42 is a projection optical system including a lens that collimates the incident light, collimates the first image light G1 from the display panel 41 to be in a state of having a predetermined light beam width, and emits the resultant light, in a state of covering a predetermined angle range corresponding to a pixel position, toward the first optical member 31c. A first optical axis X1 passing through the collimator lens 42 is in a direction rotated in the counterclockwise direction by a predetermined angle α1 in the XZ plane with respect to the +Z direction toward the front surface.

In the first optical member 31c, the light guide member 51 is a member formed by a parallel flat plate, and has a pair of flat surfaces 51a and 51b that extend in parallel with the XY plane. In an upper left side region, that is, a region on −X and −Y sides in the light guide member 51, the first incident diffraction element 521 described below is provided on the outside world side, that is, on the +Z side, as a structure accompanying a light incident surface SI which is a part of or an extension of the flat surface 51a. In an upper side region of the light guide member 51 excluding the left end and a periphery of the left end, that is, in a main region on the +X side, the first pupil enlargement grating 531 described below is provided on the outside world side, that is, on the +Z side, as a structure accompanying an outer side surface SE that is a part of the flat surface 51a. In a lower and center region of the light guide member 51 excluding the left end and a periphery of the left end, that is, in a main region on the +Y side, the first emission diffraction grating 541 described below is provided on the side opposite to the outside world, that is, on the −Z side, as a structure accompanying a light emission surface SO that is a part of the flat surface 51b. The pair of flat surfaces 51a and 51b of the light guide member 51 function as total reflection surfaces with which the first image light G1 guided into the light guide member 51 through the first incident diffraction element 521 is guided through total reflection. Thus, the first image light G1 is guided almost without loss. For example, the light guide member 51 has a thickness of about 1 to 2 mm, and is formed by highly transparent resin or glass.

The first incident diffraction element 521 is provided in a circular region parallel to the XY plane, while facing the collimator lens 42. The first incident diffraction element 521 guides the first image light G1, emitted from the display panel 41 and transmitted through the collimator lens 42, into the light guide member 51. The first incident diffraction element 521 may be integrally formed with the light guide member 51, or may be formed separately from the light guide member 51 and joined or attached to the light incident surface SI of the light guide member 51. The first incident diffraction element 521 is configured to take in the first image light G1 incident thereon, and cause the light to propagate inside the light guide member 51 by means of diffraction effect, and is specifically a surface relief diffraction grating, for example. The first incident diffraction element 521 includes a large number of protrusions or grooves extending linearly in the vertical Y direction, and is formed by a pattern 52a having a periodicity in the lateral X direction. The pattern 52a has constant grating pitch and grating height. The grating pitch of the pattern 52a is set to cause the propagation angle to be larger than a critical angle based on a refractive index in the light guide member 51, so that the first image light G1 can propagate in the light guide member 51 through total reflection. It should be noted that the pattern 52a in the figure is illustrated in an exaggerated manner for easier understanding of the description, and does not reflect the actual pattern density or pattern size. The first incident diffraction element 521 is not limited to the one with periodic recesses and protrusions exposed on the surface, and may have an interface corresponding to the periodic recesses and protrusions embedded.

The first pupil enlargement grating 531 is provided on the +X side of the first incident diffraction element 521, and bends an optical path to make the first image light G1 that has been guided in the light guide member 51 and travelled in the +X direction travel in the +Y direction as a whole while maintaining angle information. The first pupil enlargement grating 531 may be integrally formed with the light guide member 51, or may be formed separately from the light guide member 51 and joined or attached to the outer side surface SE of the light guide member 51. The first pupil enlargement grating 531 changes, by the diffraction effect, the traveling direction of the first image light G1 in the light guide member 51, at any point while the first image light G1 is propagating while being reflected by the flat surfaces 51a and 51b of the light guide member 51, and is specifically a surface relief diffraction grating for example. The first pupil enlargement grating 531 is formed by a pattern 53a including a large number of protrusions or grooves extending linearly in a diagonal DS1 direction in parallel with the XY plane, and having periodicity in a DS2 direction that is parallel to the XY plane and is orthogonal to the DS1 direction. The DS1 direction is a direction obtained by rotating the +X direction by 45° in the clockwise direction, and is an intermediate direction between the +X direction and the +Y direction. The pattern 53a has constant grating pitch and grating height. The grating pitch of the pattern 53a in the X direction and the Y direction matches the grating pitch of the first incident diffraction element 521 in the X direction. It should be noted that the pattern 53a in the figure is illustrated in an exaggerated manner for easier understanding of the description, and does not reflect the actual pattern density or pattern size. The first pupil enlargement grating 531 is not limited to the one with periodic recesses and protrusions exposed on the surface, and may have an interface corresponding to the periodic recesses and protrusions embedded.

The first emission diffraction grating 541 is provided on the +Y side of the first pupil enlargement grating 531, and extracts the first image light G1 traveling in the +Y direction as a whole in the light guide member 51, out from the light guide member 51, to be emitted to the eye EY of the wearer US. The first emission diffraction grating 541 may be integrally formed with the light guide member 51, or may be formed separately from the light guide member 51 and joined or attached to the light emission surface SO of the light guide member 51. The first emission diffraction grating 541 transmits the first image light G1 by diffraction effect and restores the angle information before the incidence on the first incident diffraction element 521, at any point while the first image light G1 is propagating while being reflected by the flat surfaces 51a and 51b of the light guide member 51. For example, an emission angle β1 of the first image light G1 from the light emission surface SO with respect to the lateral direction is set to be equal to an incident angle α1 of the first image light G1 on the light incident surface SI with respect to the lateral direction. The first emission diffraction grating 541 is specifically a surface relief diffraction grating, for example. The first emission diffraction grating 541 includes a large number of protrusions or grooves extending linearly in the lateral X direction, and is formed by a pattern 54a having a periodicity in the vertical Y direction. The pattern 54a has constant grating pitch and grating height. The grating pitch of the pattern 54a in the Y direction matches the grating pitch of the first incident diffraction element 521 in the X direction. The first emission diffraction grating 541 is not limited to the one with periodic recesses and protrusions exposed on the surface, and may have an interface corresponding to the periodic recesses and protrusions embedded.

How the first optical device 111 guides the first image light G1 and forms a virtual image will be described below. The display panel 41 forms a still image or a moving image in color on a two-dimensional display surface 41a. The first image light G1 from the display surface 41a passes through the collimator lens 42 to be incident on the first incident diffraction element 521 at an angle corresponding to the position of the display surface 41a in the X direction in plan view as viewed in the +Y direction. Then, the first image light G1 is diffracted in an angular direction corresponding to the pitch of the pattern 52a formed on the first incident diffraction element 521, and in the light guide member 51, propagates while being totally reflected and travels in the +X direction as a whole. The first image light G1 propagating in the +X direction as a whole in the light guide member 51 is diffracted by the first pupil enlargement grating 531 to have the optical path of the light as a whole bent to be in the +Y direction, and is shifted to a position in the +X direction reflecting how many times the light has been reflected until the diffraction by the first pupil enlargement grating 531. Thus, the first pupil enlargement grating 531 is in charge of enlargement to a pupil lateral size corresponding beam width, in the lateral direction or the X direction, of the first image light G1 incident on the eye EY. The first image light G1 propagating in the +Y direction as a whole in the light guide member 51 after passing through the first pupil enlargement grating 531 is diffracted by the first emission diffraction grating 541, and emitted to the eye EY from the light emission surface SO. The first image light G1 emitted from the light emission surface SO, that is, the display light DL1 has the pupil size enlarged in the +X direction, with the state of the angle at the time of emission from the display surface 41a maintained with respect to the +X direction and the +Y direction. In other words, with the first image light G1 passing through the first optical member 31c, the pupil size is enlarged vertically and laterally. Thus, even when large vertical or lateral shift in the position of the eye EY occurs, the virtual image based on the first image light G1 from the first display element 31a can be observed.

A hatched region RH in a dot pattern is a region where a virtual image in an angle of view range covered by the first optical device 111 is completely visible. Thus, with the eye EY positioned in this region, a virtual image in an angle of view from −30° to −10° in the lateral direction can be observed completely as described below.

Referring back to FIG. 2, the second optical device 112 includes a second display element 32a that emits second image light G2 and a second optical member 32c that emits the second image light G2 as display light DL2. The second display element 32a includes the display panel 41 and the collimator lens 42. The second optical member 32c includes the light guide member 51, a second incident diffraction element 522, a second pupil enlargement grating 532, and a second emission diffraction grating 542. The second display element 32a has the same structure as the first display element 31a, except that a second optical axis X2 of the second display element 32a is inclined with respect to the first optical axis X1 of the first display element 31a, to be in parallel with the Z direction toward the front surface in particular. This results in an incident angle α2 of the second image light G2 incident on the second incident diffraction grating 522 being different from the incident angle α1 of the first image light G1 incident on the first incident diffraction grating 521. Assuming that the angle increases in the clockwise direction, the incident angle α2 of the second image light G2 is larger than the incident angle α1 of the first image light G1. The second optical member 32c has the same structure as the first optical member 31c, with the relative positional relationship among the second incident diffraction element 522, the second pupil enlargement grating 532, and the second emission diffraction grating 542 matching the relative positional relationship among the first incident diffraction element 521, the first pupil enlargement grating 531, and the first emission diffraction grating 541 of the first optical member 31c. Still, the pitch of the patterns 52a, 53a, and 54a in the second incident diffraction element 522, the second pupil enlargement grating 532, and the second emission diffraction grating 542 is set to be smaller than the pitch of the patterns 52a, 53a, and 54a of the first incident diffraction element 521, the first pupil enlargement grating 531, and the first emission diffraction grating 541 of the first optical member 31c, to facilitate satisfaction of a condition for the total reflection with regard to the incident angle α2.

As illustrated in FIG. 4, a pitch P2 of the second incident diffraction element 522 in the second optical member 32c is set to be smaller than a pitch P1 of the first incident diffraction element 521 in the first optical member 31c. This results in an angle of diffraction by the first incident diffraction grating 521 for the first image light G1 being smaller than an angle of diffraction by the second incident diffraction grating 522 for the second image G2.

Referring back to FIG. 2, the third optical device 113 includes a third display element 33a that emits third image light G3 and a third optical member 33c that emits the third image light G3 as display light DL3. The third display element 33a includes the display panel 41 and the collimator lens 42. The third optical member 33c includes the light guide member 51, a third incident diffraction element 523, a third pupil enlargement grating 533, and a third emission diffraction grating 543. The third display element 33a has the same structure as the first display element 31a, except that a third optical axis X3 of the third display element 33a is inclined with respect to the first optical axis X1 of the first display element 31a and the second optical axis X2 of the second display element 32a, to be in a direction rotated in the clockwise direction by a predetermined angle α3 with respect to the +Z direction toward the front surface. This results in an incident angle α3 of the third image light G3 incident on the third incident diffraction grating 523 being different from the incident angle α2 of the second image light G2 incident on the second incident diffraction grating 522. Assuming that the angle increases in the clockwise direction, the incident angle α3 of the third image light G3 is larger than the incident angle α2 of the second image light G2. The third optical member 33c has the same structure as the first optical member 31c or the second optical member 32c, with the relative positional relationship among the third incident diffraction element 523, the third pupil enlargement grating 533, and the third emission diffraction grating 543 matching the relative positional relationship among the first incident diffraction element 521, the first pupil enlargement grating 531, and the first emission diffraction grating 541 of the first optical member 31c. Still, the pitch of the patterns 52a, 53a, and 54a in the third incident diffraction element 523, the third pupil enlargement grating 533, and the third emission diffraction grating 543 is set to be smaller than the pitch of the patterns 52a, 53a, and 54a of the second incident diffraction element 522, the second pupil enlargement grating 532, and the second emission diffraction grating 542 of the second optical member 32c, to facilitate satisfaction of a condition for the total reflection with regard to the incident angle.

As illustrated in FIG. 4, a pitch P3 of the third incident diffraction element 523 in the third optical member 33c is set to be smaller than the pitch P2 of the second incident diffraction element 522 in the second optical member 32c. This results in an angle of diffraction by the second incident diffraction grating 522 for the second image light G2 being smaller than an angle of diffraction by the third incident diffraction grating 523 for the third image G3.

The pitches P1, P2, and P3 of the first incident diffraction element 521, the second incident diffraction element 522, and the third incident diffraction element 523 satisfy the relationship P1>P2>P3.

Referring back to FIG. 2, the second optical member 32c is arranged while being shifted to be more on the +X side than the first optical member 31c and the third optical member 33c is arranged while being shifted to be more on the +X side than the second optical member 32c, whereby the image light G1, G2, and G3 from the respective optical members 31c, 32c, and 33c is incident, in an overlapping manner, on an exit pupil EP where the eye EY is supposed to be arranged. In this case, the second incident diffraction element 522 of the second optical member 32c is arranged to be more on the +X side than the first incident diffraction element 521 of the first optical member 31c. The second pupil enlargement grating 532 is arranged to be more on the +X side than the first pupil enlargement grating 531. The second incident diffraction element 522 is provided to the second optical member 32c to partially overlap with the first pupil enlargement grating 531 as viewed from the exit pupil EP. The second pupil enlargement grating 532 is provided to the second optical member 32c to partially overlap with the third pupil enlargement grating 533 as viewed from the exit pupil EP. The third incident diffraction element 523 of the third optical member 33c is arranged to be more on the +X side than the second incident diffraction element 522 of the second optical member 32c. The third pupil enlargement grating 533 is arranged to be more on the +X side than the second pupil enlargement grating 532. The third incident diffraction element 523 is provided to the third optical member 33c so as to overlap with the second pupil enlargement grating 532 as viewed from the exit pupil EP. The third pupil enlargement grating 533 is provided to the third optical member 33c to partially overlap with the second pupil enlargement grating 532 as viewed from the exit pupil EP.

The first emission diffraction grating 541 overlaps with the second emission diffraction grating 542 as viewed from the exit pupil EP. The second emission diffraction grating 542 overlaps with the third emission diffraction grating 543 as viewed from the exit pupil EP. As a result, the second emission diffraction grating 542 causes the second image light G2 to pass through the first emission diffraction grating 541 and to be emitted toward the position where the exit pupil EP is formed. The third emission diffraction grating 543 causes the third image light G3 to pass through the second emission diffraction grating 542 and to be emitted toward the position where the exit pupil EP is formed. Assuming that the observation is made from the eye EY, a display region EA1 onto which the first image light G1 is emitted from the first emission diffraction grating 541, a display region EA2 onto which the second image light G2 is emitted from the second emission diffraction grating 542, and a display region EA3 onto which the third image light G3 is emitted from the third emission diffraction grating 543 partially overlap with each other while being at different positions in the lateral direction.

In the first optical device 111, the first incident diffraction grating 521 and the first pupil enlargement grating 531 are provided on the flat surface 51a which is on one side, that is, the +Z side of the first optical member 31c or the light guide member 51, and the first emission diffraction grating 541 is provided on the flat surface 51b which is on the other side, that is the −Z side of the first optical member 31c or the light guide member 51. With this configuration, the first display element 31a can be disposed on the outer side, whereby a sufficient space can be reliably provided between the first optical member 31c and the exit pupil EP. Similarly, in the second optical device 112, the second incident diffraction grating 522 and the second pupil enlargement grating 532 are provided on the flat surface 51a which is on one side of the second optical member 32c, and the second emission diffraction grating 542 is provided on the flat surface 51b which is on the other side of the second optical member 32c. In the third optical device 113, the third incident diffraction grating 523 and the third pupil enlargement grating 533 are provided on the flat surface 51a which is on one side of the third optical member 33c, and the third emission diffraction grating 543 is provided on the flat surface 51b which is on the other side of the third optical member 33c.

Referring to FIG. 4, an angle range θ1 of the first image light G1, incident on the first optical member 31c from the first display element 31a, in the XZ plane is in a range of −30° to −10°, with the Z direction being 0° for example, and thus has an angle difference of 20°. An angle range θ2 of the second image light G2, incident on the second optical member 32c from the second display element 32a, in the XZ plane is −10° to +10°, with the Z direction being 0° for example, and thus has an angle difference of 20°. An angle range θ3 of the third image light G3, incident on the third optical member 33c from the third display element 33a, in the XZ plane is in a range of +10° to +30°, with the Z direction being 0° for example, and thus has an angle difference of 20°. As a result, an angle of view θ11 of the first image light G1 emitted from the first optical member 31c in the XZ plane is in a range of −30° to −10° that is equal to the angle range θ1. An angle of view θ21 of the second image light G2 emitted from the second optical member 32c in the XZ plane is in a range of −10° to +10° that is equal to the angle range θ2. An angle of view θ31 of the third image light G3 emitted from the third optical member 33c in the XZ plane is in a range of +10° to +30° that is equal to the angle range θ3. With the above configuration, a virtual image continuously covering the angle of view in a range of −30° to +30° can be provided to the eye EY. In order to achieve the continuous angle of view as described above, in the first display element 31a, the inclination of the first optical axis X1 is set to α1=−20° in the counterclockwise direction. In the third display element 33a, the inclination of the third optical axis X3 is set to α3=+20° in the counterclockwise direction.

Figure 5:
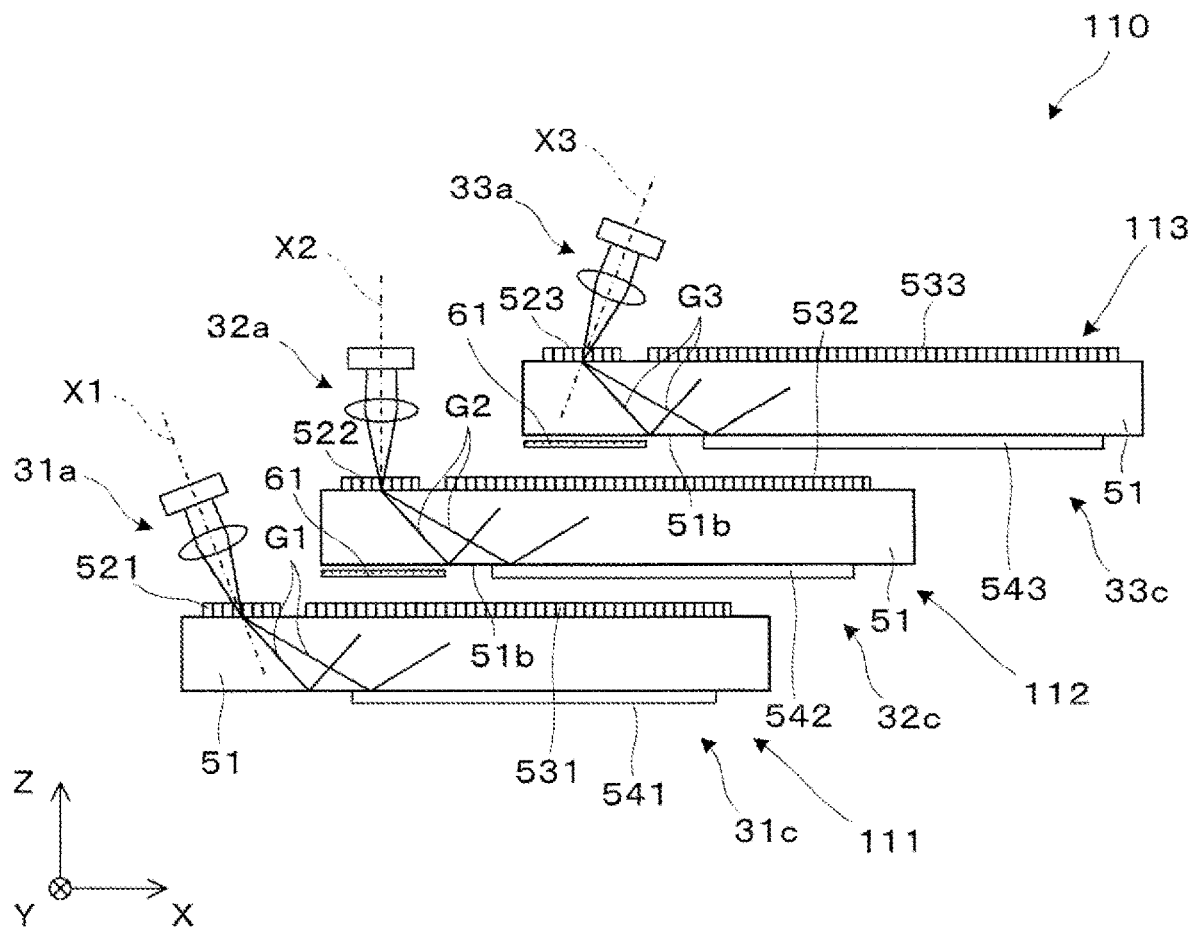
FIG. 5 is a plan view illustrating a virtual image display apparatus according to a modification.

FIG. 5 is a plan view illustrating a virtual image display apparatus 110 according to a modification. Here, in the second optical member 32c of the second optical device 112, a light shielding member 61 is disposed on the opposite side of the second incident diffraction element 522 with the light guide member 51 provided in between. The light shielding member 61 faces the flat surface 51b of the light guide member 51 while being separated from the flat surface 51b. The light shielding member 61 prevents the second image light G2 that has transmitted through the second incident diffraction element 522 from being incident on the light guide member 51 of the first optical member 31c adjacently arranged, by absorbing or blocking the second image light G2 that has transmitted through the second incident diffraction element 522. The light shielding member 61 is arranged while being separated from the light guide member 51, to prevent absorption of all the second image light G2, that has been made incident on the light guide member 51 by the second incident diffraction element 522. Also in the third optical member 33c of the third optical device 113, the light shielding member 61 is disposed on the opposite side of the third incident diffraction element 523 with the light guide member 51 provided in between, while being separated from the light guide member 51. The light shielding member 61 prevents the third image light G3 that has transmitted through the third incident diffraction element 523 from being incident on the light guide member 51 of the second optical member 32c.

The light shielding member 61 can be fixed to a portion of the light guide member 51 not affecting the optical path, or may be fixed to the support device 120 (FIG. 1) using a fixing member not illustrated.

The virtual image display apparatus 110 according to the first exemplary embodiment described above includes: the first display element 31a configured to emit the first image light G1, the second display element 32a configured to emit the second image light G2, the first optical member 31c including the first incident diffraction grating 521 on which the first image light G1 from the first display element 31a is incident, the first emission diffraction grating 541 configured to emit the incident first image light G1 toward a position where the exit pupil EP is formed, and the first pupil enlargement grating 531 configured to diffract the first image light G1 from the first incident diffraction grating 521 toward the first emission diffraction grating 541, and the second optical member 32c including the second incident diffraction grating 522 on which the second image light G2 from the second display element 32a is incident, the second emission diffraction grating 542 configured to emit the incident second image light G2 toward the position where the exit pupil EP is formed, and the second pupil enlargement grating 532 configured to diffract the second image light G2 from the second incident diffraction grating 522 toward the second emission diffraction grating 542. As viewed from the exit pupil EP, the first emission diffraction grating 541 overlaps with the second emission diffraction grating 542 and a region of the first emission diffraction grating 541 emitting the first image light G1 is different from a region of the second emission diffraction grating 542 emitting the second image light G2.

In the virtual image display apparatus described above, as viewed from the exit pupil EP, the first emission diffraction grating 541 and the second emission diffraction grating 542 overlap, and a region of the first emission diffraction grating 541 emitting the first image light G1 is different from a region of the second emission diffraction grating 542 emitting the second image light G2. As a result, an optical path from the first display element 31a to the first emission diffraction grating 541 can be prevented from being largely different from an optical path from the second display element 32a to the second emission diffraction grating 542. Thus, unevenness in luminance in a virtual image displayed due to an increased difference in luminance between the first image light G1 emitted from the first emission diffraction grating 541 and the second image light G2 emitted from the second emission diffraction grating 542 can be suppressed.

Second Exemplary Embodiment

Hereinafter, a virtual image display apparatus according to a second exemplary embodiment of the present disclosure will be described. Note that the virtual image display apparatus according the second exemplary embodiment is obtained by partially modifying a part of the virtual image display apparatus according to the first exemplary embodiment, and description on common portions is omitted.

Figure 6:
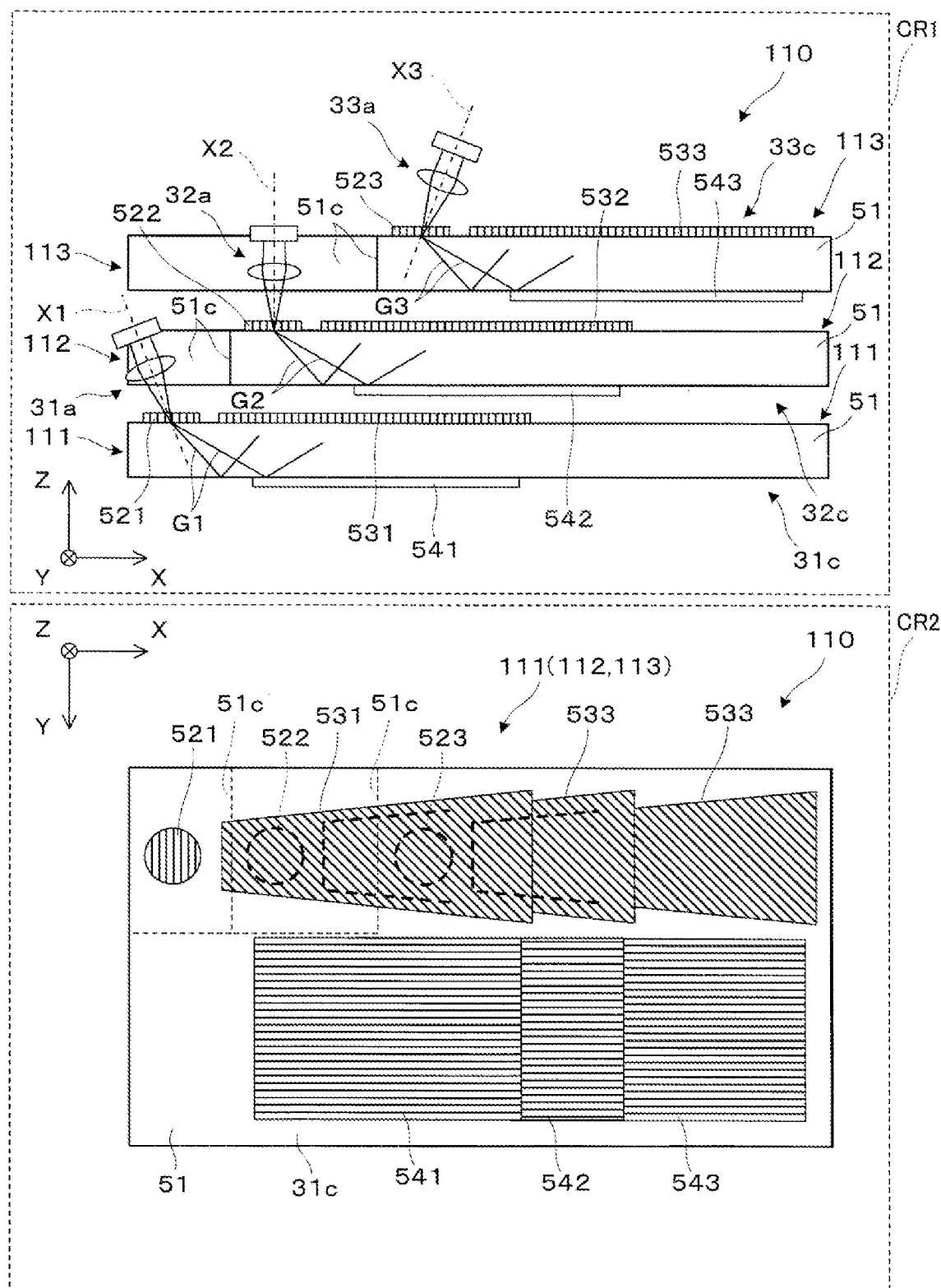
FIG. 6 is a plan view and a back view of a virtual image display apparatus according to a second exemplary embodiment.

A virtual image display apparatus 110 of the second exemplary embodiment will be described with reference to FIG. 6. In FIG. 6, a region CR1 is a plan view of the virtual image display apparatus 110, and a region CR2 is a back view of the virtual image display apparatus 110. Here, the first optical device 111, the second optical device 112, and the third optical device 113 have substantially the same size in the vertical and lateral directions with respect to the XY plane, and overlap each other in the Z direction. Still, the light guide member 51 of the first optical member 31c and the second optical member 32c have corners provided with notches 51c, so that the arrangement of the first display element 31a and the second display element 32a is not hindered.

Here, the first optical member 31c, the second optical member 32c, and the third optical member 33c have the same overlapping size, and are wide enough to cover an area in front of the eye. Thus, the wearer US is less likely to see an end portion of the light guide member 51 and is less likely to see an optical structure of the optical members 31c, 32c, and 33c. With an ingenious way of arranging the first display element 31a and the second display element 32a, the notches 51c may not be required.

In the example illustrated in FIG. 6, the relative position of the first pupil enlargement grating 531 provided in the first optical member 31c partially overlaps with but is different from the relative position of the second pupil enlargement grating 532 provided in the second optical member 32c, and also partially overlaps with but is different from the relative position of the third pupil enlargement grating 533 provided in the third optical member 33c.

Figure 7:
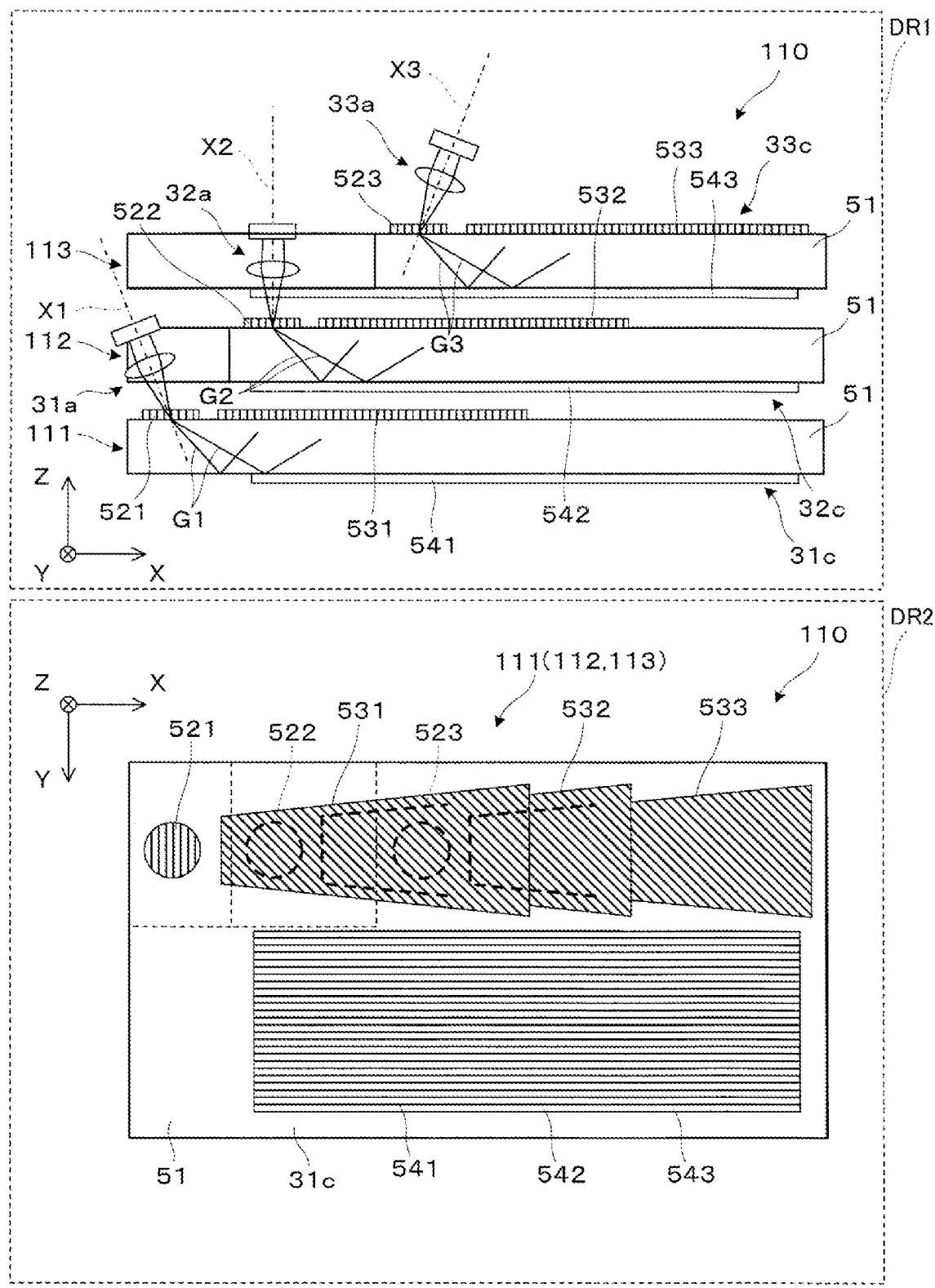
FIG. 7 is a plan view and a back view illustrating a virtual image display apparatus according to a modification.

FIG. 7 is a diagram illustrating a virtual image display apparatus 110 according to a modification. In FIG. 7, a region DR1 is a plan view of the virtual image display apparatus 110, and a region DR2 is a back view of the virtual image display apparatus 110. Here, in the second optical member 32c of the second optical device 112, the second emission diffraction grating 542 expands vertically and laterally to cover the third emission diffraction grating 543 of the third optical member 33c of the third optical device 113 as a whole. In the first optical member 31c of the first optical device 111, the first emission diffraction grating 541 expands vertically and laterally to cover the second emission diffraction grating 542 of the second optical member 32c of the second optical device 112 as a whole. In other words, the second emission diffraction grating 542 and the first emission diffraction grating 541 expand beyond a region required for the imaging function. In the illustrated example, in particular, the +X side and +Y side edges of the second emission diffraction grating 542 and the third emission diffraction grating 543 match the edges of the first emission diffraction grating 541. As a result, the edges of not only the first emission diffraction grating 541 but also of the second emission diffraction grating 542 and the third emission diffraction grating 543 are likely to be invisible from the wearer US.

Figure 8:
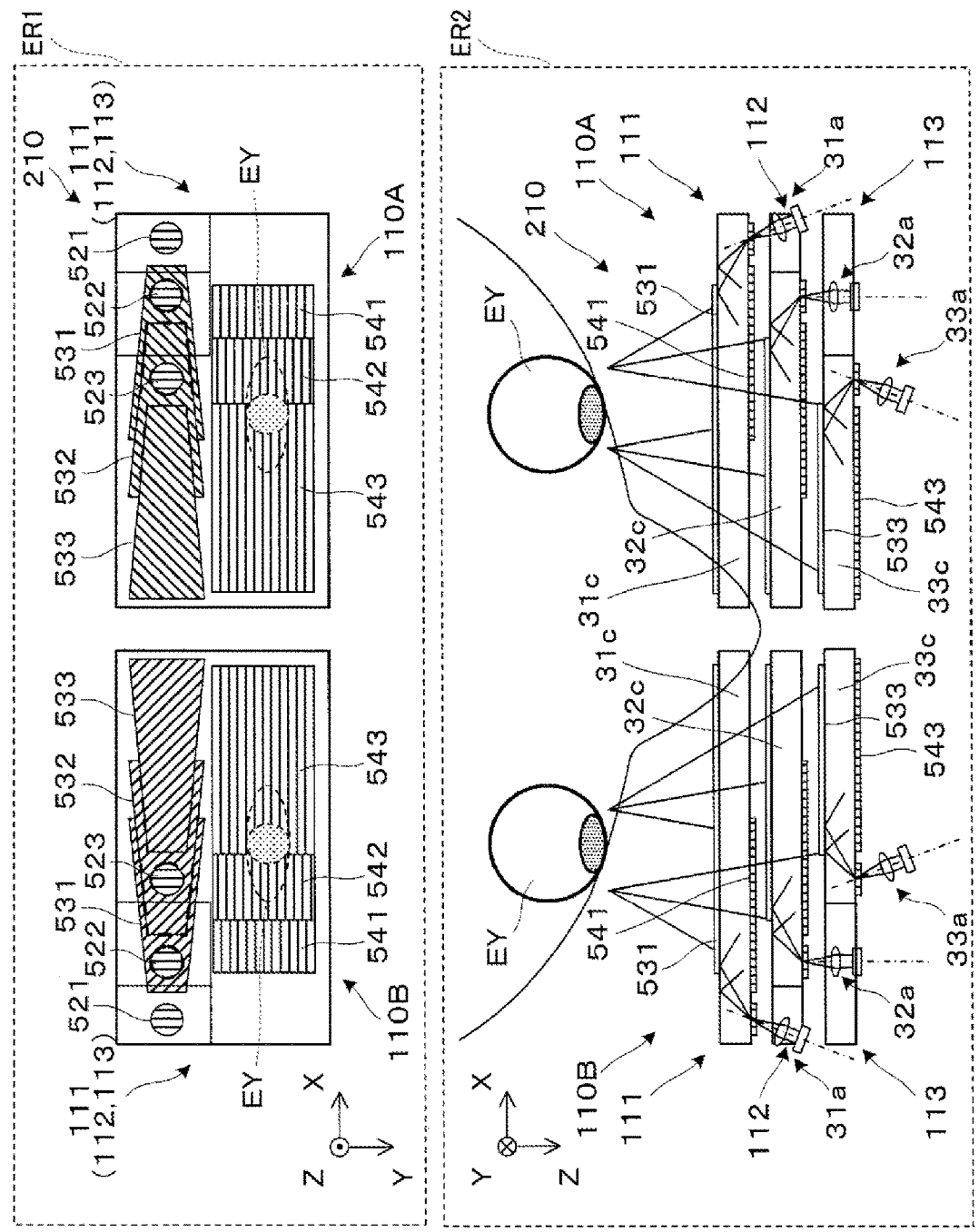
FIG. 8 is a diagram illustrating a virtual image display apparatus according to still another modification.

FIG. 8 is a diagram illustrating a virtual image display apparatus 210 according to still another modification. In FIG. 8, a region ER1 is a front view of the virtual image display apparatus 210, and a region ER2 is a plan view of the virtual image display apparatus 210. The virtual image display apparatus 210 is for both eyes, and includes a virtual image display apparatus 110A for the left eye and a virtual image display apparatus 110B for the right eye. Note that the virtual image display apparatuses 110A and 110B are similar to the virtual image display apparatus 110 illustrated in FIG. 6, but may be similar to the virtual image display apparatus 110 illustrated in FIG. 7.

Figure 9:
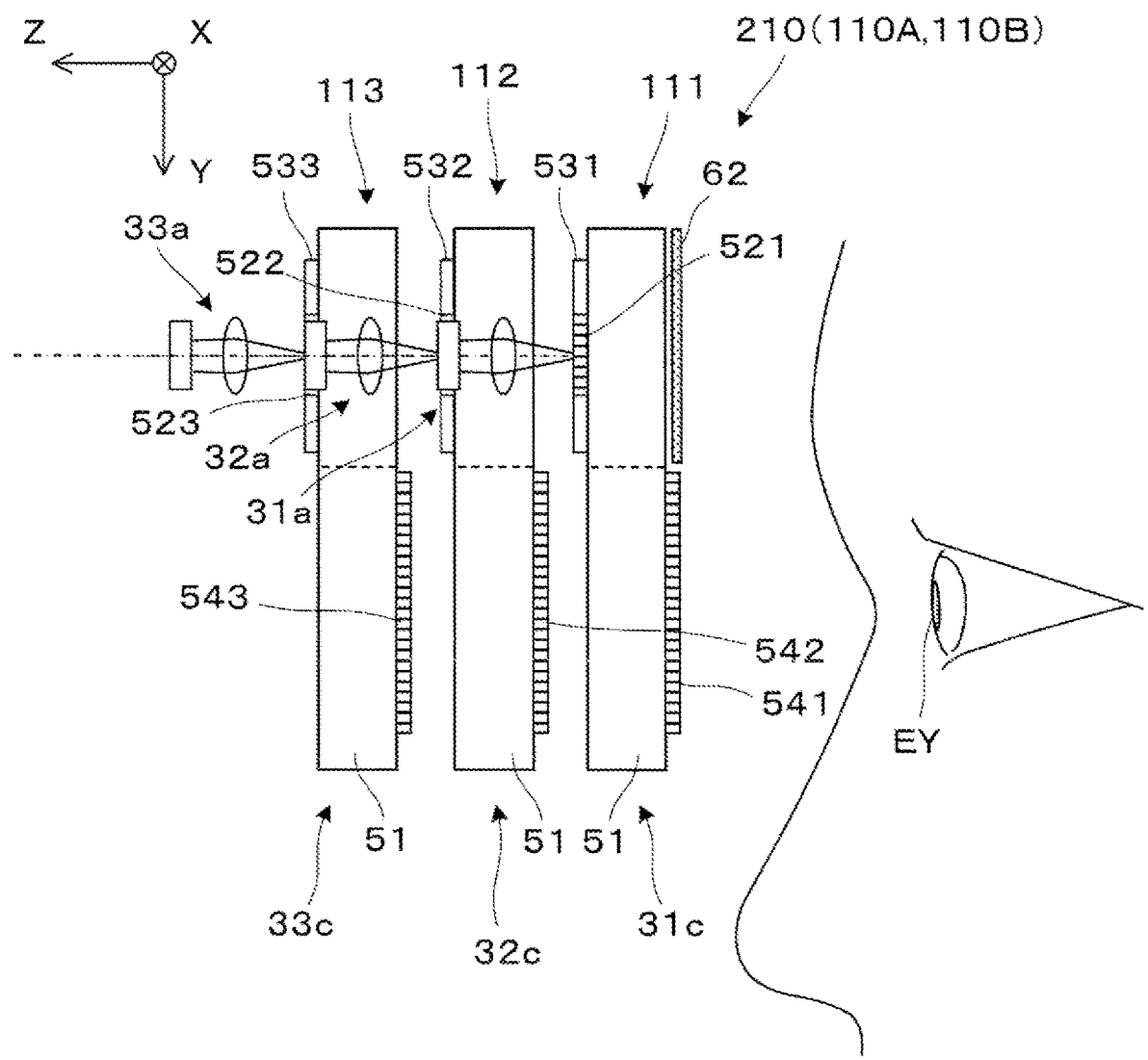
FIG. 9 is a side view illustrating a modification of the virtual image display apparatus illustrated in FIG. 8.

FIG. 9 is a side view illustrating a modification of the virtual image display apparatus 210 illustrated in FIG. 8. On the inner side of the virtual image display apparatuses 110A and 110B opposite to the pupil enlargement gratings 531, 532 and 533 and the like, a light shielding member 62 is arranged while being separated from the light guide member 51. The light shielding member 62 prevents the display elements 31a, 32a, and 33a from being arranged within the field of view in an observable state, and prevents the pupil enlargement gratings 531, 532, and 533 from being arranged within the field of view in an observable state.

Third Exemplary Embodiment

Hereinafter, a virtual image display apparatus according to a third exemplary embodiment of the present disclosure will be described. Note that the virtual image display apparatus according the third exemplary embodiment is obtained by partially modifying a part of the virtual image display apparatus according to the first exemplary embodiment, and description on common portions is omitted.

Figure 10:
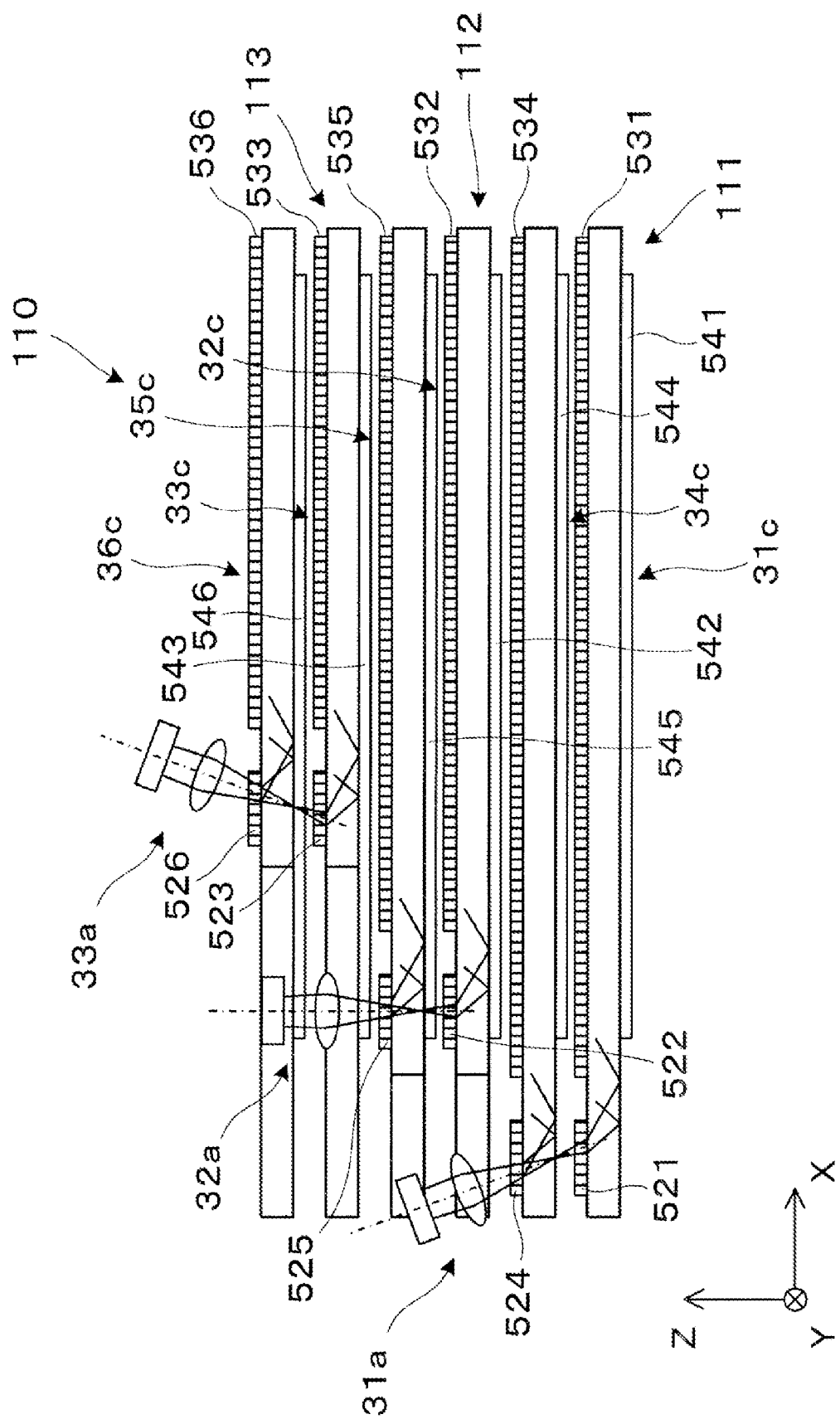
FIG. 10 is a plan view illustrating a virtual image display apparatus according to a third exemplary embodiment.

FIG. 10 is a plan view illustrating a virtual image display apparatus 110 according to the third exemplary embodiment. The first optical device 111 includes a fourth optical member 34c serving as a second wavelength optical member. The second optical device 112 includes a fifth optical member 35c serving as a second wavelength optical member. The third optical device 113 includes a sixth optical member 36c serving as a second wavelength optical member. The fourth optical member 34c is sandwiched between the first optical member 31c and the second optical member 32c. The fifth optical member 35c is sandwiched between the second optical member 32c and the third optical member 33c. The sixth optical member 36c is disposed on the outside world side to be opposite to the third optical member 33c.

The first display element 31a forms image light GB in the blue region, image light GG in the green region, and image light GR in the red region. The second display element 32a and the third display element 33a also form the image light GB in the blue region, the image light GG in the green region, and the image light GR in the red region.

The first optical member 31c, the second optical member 32c, and the third optical member 33c are provided for the image light GB and the image light GG in the blue region and the green region, which are the first wavelength region, and efficiently propagate the image light GB and the image light GG. The fourth optical member 34c, the fifth optical member 35c, and the sixth optical member 36c are provided for the image light GR in the red region, which is a second wavelength region, and efficiently propagate the image light GR.

As with the first optical member 31c, the left angle of view is covered with the fourth optical member 34c. The fourth optical member 34c includes: a long wavelength incident diffraction grating 524 that diffracts the image light GR in the red region that is the second wavelength region, a long wavelength emission diffraction grating 544 that makes the incident image light GR emitted toward the position where the exit pupil EP is formed, a long wavelength pupil enlargement grating 534 that diffracts the image light GR from the long wavelength incident diffraction grating 524, to the long wavelength emission diffraction grating 544. The image light GR incident on the long wavelength incident diffraction grating 524 of the fourth optical member 34c is coupled to the accompanying light guide member 51. Meanwhile, the image light GB and the image light GG in the blue region and the green region that have transmitted through the long wavelength incident diffraction grating 524 are coupled to the light guide member 51 by the first incident diffraction grating 521 provided to the next first optical member 31c.

As with the second optical member 32c, the center angle of view is covered with the fifth optical member 35c. The fifth optical member 35c includes: a long wavelength incident diffraction grating 525 that diffracts the image light GR in the red region that is the second wavelength region, a long wavelength emission diffraction grating 545 that makes the incident image light GR emitted toward the position where the exit pupil EP is formed, a long wavelength pupil enlargement grating 535 that diffracts the image light GR from the long wavelength incident diffraction grating 525, to the long wavelength emission diffraction grating 545. The image light GR incident on the long wavelength incident diffraction grating 525 of the fifth optical member 35c is coupled to the accompanying light guide member 51. Meanwhile, the image light GB and the image light GG in the blue region and the green region that have transmitted through the long wavelength incident diffraction grating 525 are coupled to the light guide member 51 by the second incident diffraction grating 522 provided to the next second optical member 32c.

As with the third optical member 33c, the right angle of view is covered with the sixth optical member 36c. The sixth optical member 36c includes: a long wavelength incident diffraction grating 526 that diffracts the image light GR in the red region that is the second wavelength region, a long wavelength emission diffraction grating 546 that makes the incident image light GR emitted toward the position where the exit pupil EP is formed, a long wavelength pupil enlargement grating 536 that diffracts the image light GR from the long wavelength incident diffraction grating 526, to the long wavelength emission diffraction grating 546. The image light GR incident on the long wavelength incident diffraction grating 526 of the sixth optical member 36c is coupled to the accompanying light guide member 51. Meanwhile, the image light GB and the image light GG in the blue region and the green region that have transmitted through the long wavelength incident diffraction grating 526 are coupled to the light guide member 51 by the third incident diffraction grating 523 provided to the next third optical member 33c.

Figure 11:
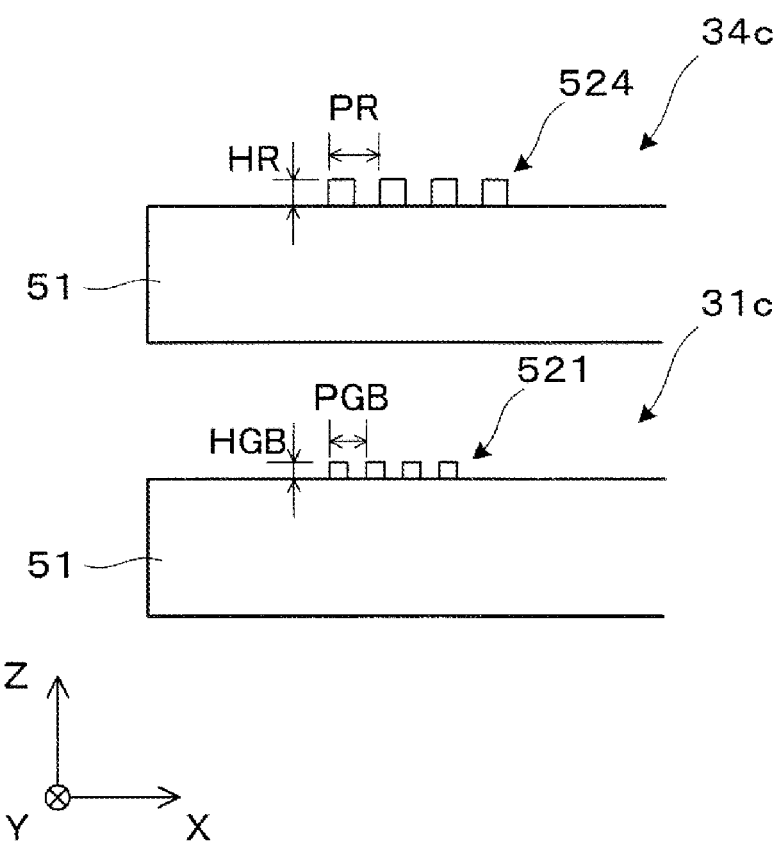
FIG. 11 is a diagram illustrating comparison between a first incident diffraction grating and a long wavelength incident diffraction grating.

FIG. 11 is a partially enlarged cross-sectional view illustrating the structure of the first incident diffraction grating 521 and the structure of the long wavelength incident diffraction grating 524 for comparison and description. A pitch PR of the long wavelength incident diffraction grating 524 is longer than a pitch PGB of the first incident diffraction grating 521. A grating height HR of the long wavelength incident diffraction grating 524 is higher than a grating height HGB of the first incident diffraction grating 521. The above description is given based on the comparison between the first incident diffraction grating 521 and the long wavelength incident diffraction grating 524. A comparison between the second incident diffraction grating 522 and the long wavelength incident diffraction grating 525 indicates that the long wavelength incident diffraction grating 525 has relatively longer and higher pitch and grating height than the second incident diffraction grating 522. A comparison between the third incident diffraction grating 523 and the long wavelength incident diffraction grating 526 indicates that the long wavelength incident diffraction grating 526 has relatively longer and higher pitch and grating height than the third incident diffraction grating 523.

While in the above description, the image light GR is coupled to the light guide member 51 using the long wavelength incident diffraction grating 524, the image light GR and the image light GG in the red region and the green region may be coupled to the light guide member 51 using the long wavelength incident diffraction grating 524, and the image light GB in the blue region may be coupled to the light guide member 51 using the first incident diffraction grating 521. In this case, the long wavelength incident diffraction gratings 525 and 526 are for the image light GR and the image light GG in the red region and the green region.

Fourth Exemplary Embodiment

Hereinafter, a virtual image display apparatus according to a fourth exemplary embodiment of the present disclosure will be described. Note that the virtual image display apparatus according the fourth exemplary embodiment is obtained by partially modifying a part of the virtual image display apparatus according to the first exemplary embodiment, and description on common portions is omitted.

Figure 12:
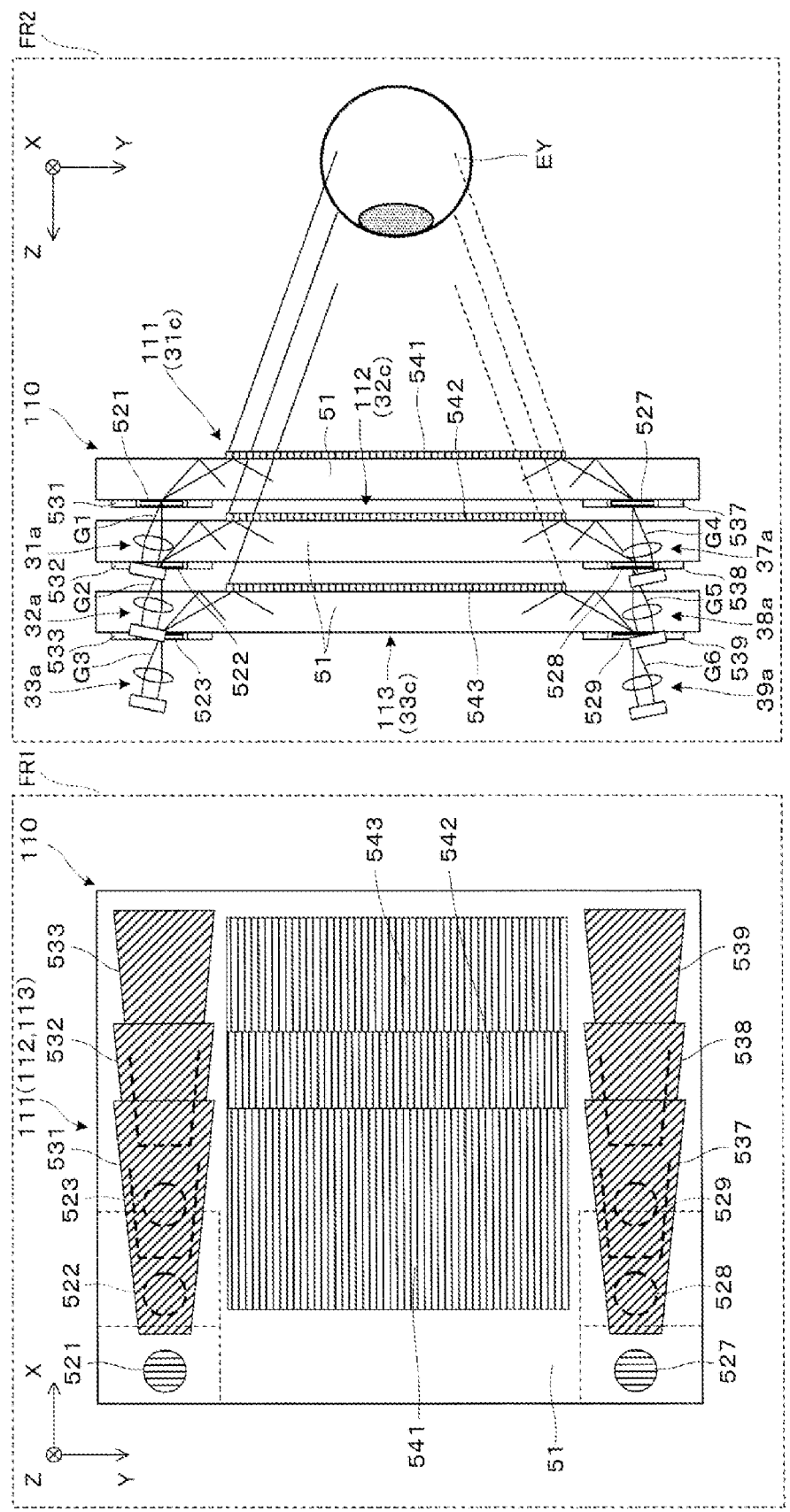
FIG. 12 is a back view and a side view of a virtual image display apparatus according to a fourth exemplary embodiment.

A virtual image display apparatus 110 according to the fourth exemplary embodiment is described with reference to FIG. 12. In FIG. 12, a region FR1 is a back view of the virtual image display apparatus 110, and a region FR2 is a side view of the virtual image display apparatus 110.

The first optical device 111 includes, as elements provided in addition to the first display element 31a, a fourth display element 37a corresponding to a third display element in claims that emits fourth image light G4 corresponding to third image light in claims. The first optical device 111 includes, as elements provided in the first optical member 31c in addition to the light guide member 51, the first incident diffraction element 521, the first pupil enlargement grating 531, and the first emission diffraction grating 541: a fourth incident diffraction grating 527 corresponding to a third incident diffraction grating in claims on which the fourth image light G4 from the fourth display element 37a as the third display element is incident, and a fourth pupil enlargement grating 537 corresponding to a third pupil enlargement grating in claims that diffracts the fourth image light G4 from the fourth incident diffraction grating 527 to the first emission diffraction grating 541.

The second optical device 112 includes, as elements provided in addition to the second display element 32a, a fifth display element 38a corresponding to a fourth display element in claims that emits fifth image light G5 corresponding to fourth image light in claims. The second optical device 112 includes, as elements provided in the second optical member 32c in addition to the light guide member 51, the second incident diffraction element 522, the second pupil enlargement grating 532, and the second emission diffraction grating 542: a fifth incident diffraction grating 528 corresponding to a fourth incident diffraction grating in claims on which the fifth image light G5 from the fifth display element 38a as the fourth display element is incident, and a fifth pupil enlargement grating 538 corresponding to a fourth pupil enlargement grating in claims that diffracts the fifth image light G5 from the fifth incident diffraction grating 528 to the second emission diffraction grating 542.

The third optical device 113 includes a sixth display element 39a that emits sixth image light G6, as an element provided in addition to the third display element 33a. The third optical device 113 includes, as elements provided in the third optical member 33c in addition to the light guide member 51, the third incident diffraction element 523, the third pupil enlargement grating 533, and the third emission diffraction grating 543: a sixth incident diffraction grating 529 on which the sixth image light G6 from the sixth display element 39a, and a sixth pupil enlargement grating 539 that diffracts the sixth image light G6 from the sixth incident diffraction grating 529 to the third emission diffraction grating 543.

Figure 13:
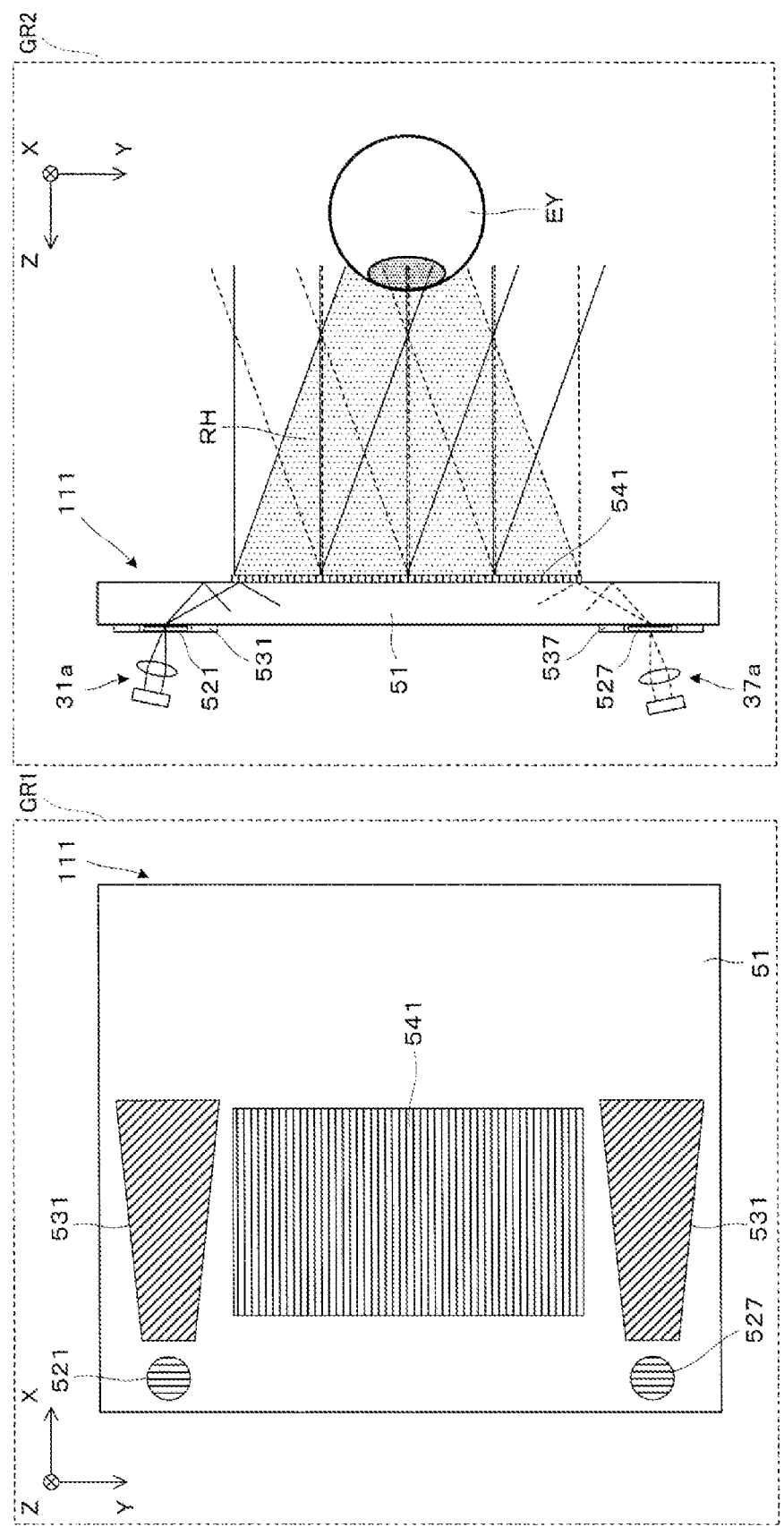
FIG. 13 is a back view and a side view illustrating a structure of a first optical device.

FIG. 13 is a diagram illustrating a structure of the first optical device 111. In FIG. 13, a region GR1 is a side view of the first optical device 111, and a region GR2 is a back view of the first optical device 111. Here, the angle of view is split in two (split in two for example) further in the vertical direction of the screen, that is, in the Y direction, to display a virtual image of a large angle of view as a whole in both vertical and lateral directions.

In this case, two image projection modules, that is, the first display element 31a and the fourth display element 37a are in charge of image formation in the vertical direction. The first display element 31a which is one of these, is in charge of the angle of view from 0° to +20° in the Y direction, whereas the fourth display element 37a which is the other one is in charge of the angle of view from −20° to 0° in the Y direction. To couple the first image light G1 and the fourth image light G4 to the light guide member 51 of the first optical member 31c, the first display element 31a and the fourth display element 37a are inclined in the Y direction with respect to the normal lines of the first incident diffraction element 521 and the fourth incident diffraction element 527 by +10° and −10°, respectively. The angle of view of the image light emitted from the first emission diffraction grating 541 is from 0° to +20° (illustrated in solid line in the drawing) and from −20° to 0° (illustrated in dashed line in the drawing), is symmetric in the vertical direction, that is, the Y direction, and can have the matching pitch. Thus, the first emission diffraction grating 541 can be commonly used. Note that the pitch of the diffraction grating of the first incident diffraction element 521 and the pitch of the diffraction grating of the fourth incident diffraction element 527 match. The pitch of the diffraction grating of the second incident diffraction element 522 and the pitch of the diffraction grating of the fifth incident diffraction element 528 match. The pitch of the diffraction grating of the third incident diffraction element 523 and the pitch of the diffraction grating of the sixth incident diffraction element 529 match.

A hatched region RH in a dot pattern is a region where a virtual image in an angle of view range vertically divided is completely visible. Thus, with the eye EY positioned in this region, a virtual image in an angle of view of 40° in the virtual image, that is, the Y direction can be observed completely as described below. In this case, the light guide member 51 is only required to propagate the light for an angle of view of 20°, to enable the observation of a virtual image as a whole in the angle of view of 40° in the Y direction. With the angle of view required to be achieved by the propagation in the light guide member 51 being thus small, unevenness in brightness and color of the virtual image can be reduced.

Figure 14:
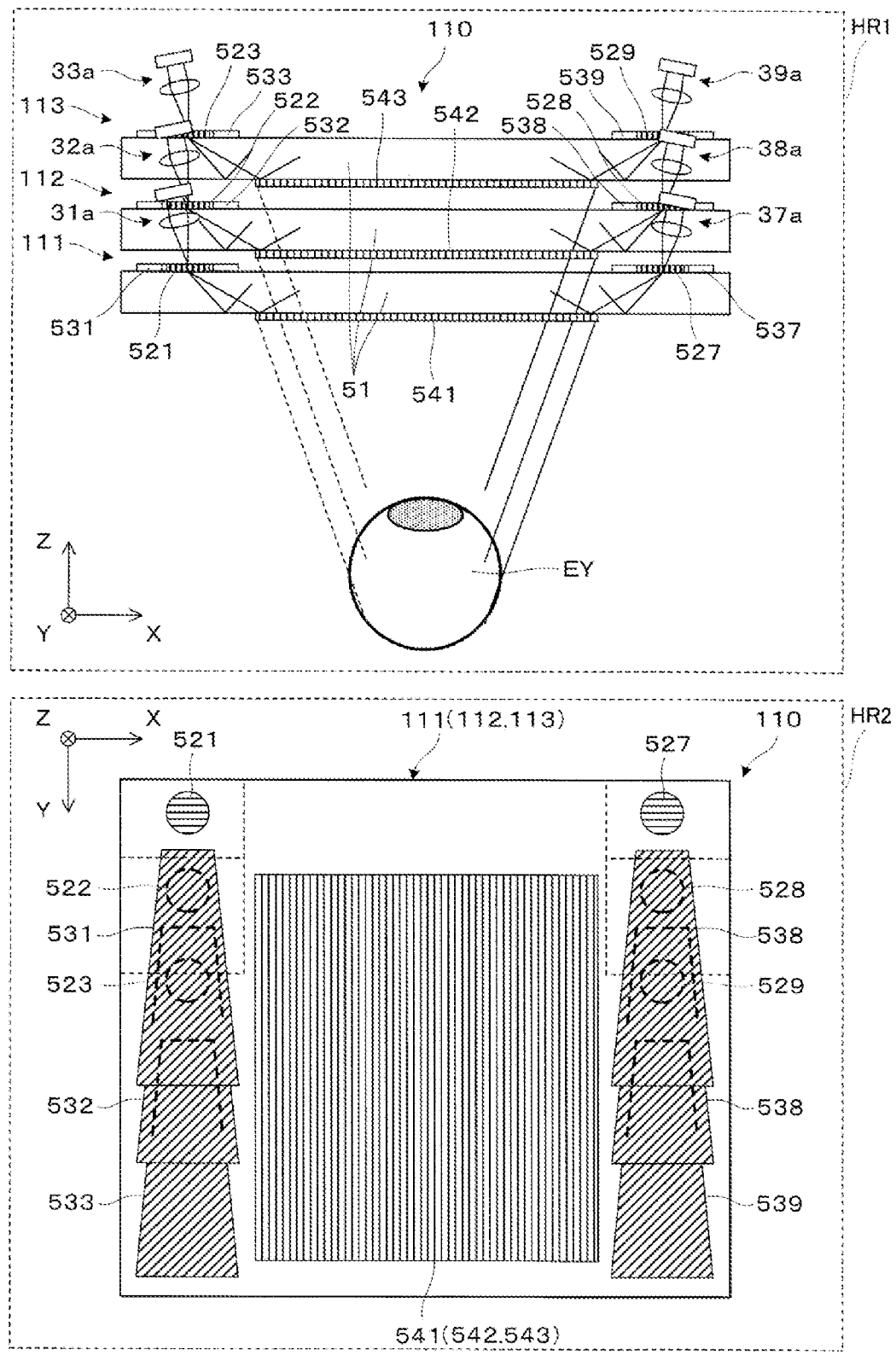
FIG. 14 is a plan view and a back view illustrating a virtual image display apparatus according to a modification.

FIG. 14 is a diagram illustrating a virtual image display apparatus 110 according to a modification. In FIG. 14, a region HR1 is a plan view of a first optical device 111, and a region HR2 is a back view of the first optical device 111. Here, the vertical aspect and the lateral aspect of the virtual image display apparatus 110 illustrated in FIG. 13 are swapped, and the angle of view range is splint in three in the vertical direction and split in two in the lateral direction.

Figure 15:
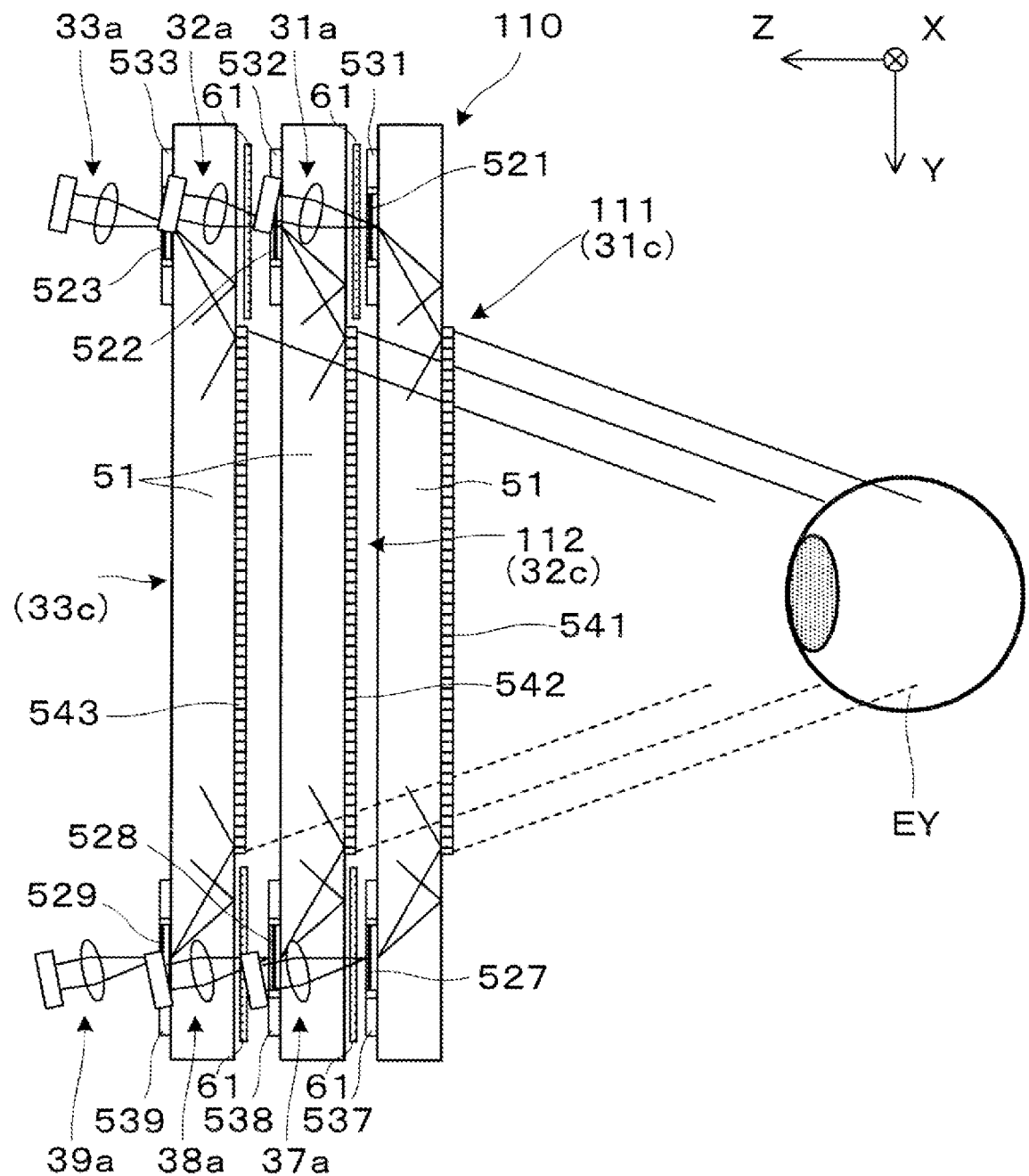
FIG. 15 is a plan view illustrating a virtual image display apparatus according to a modification.

FIG. 15 is a diagram illustrating a virtual image display apparatus 110 according to another modification, and corresponds to FIG. 12. Here, in the second optical member 32c of the second optical device 112, a light shielding member 61 is disposed on the opposite side (first optical device 111 side) of the second incident diffraction element 522 with the light guide member 51 provided in between. The light shielding member 61 is disposed on the opposite side (first optical device 111 side) of the fifth incident diffraction element 528, with the light guide member 51 provided in between. The light shielding member 61 prevents light from leaking between the light guide members 51.

In the third optical member 33c of the third optical device 113, the light shielding member 61 is disposed on the opposite side (second optical device 112 side) of the third incident diffraction element 523 with the light guide member 51 provided in between. The light shielding member 61 is disposed on the opposite side (second optical device 112 side) of the sixth incident diffraction element 529 with the light guide member 51 provided in between. The light shielding member 61 prevents light from leaking between the light guide members 51.

OTHER MATTERS

The structures described above are merely examples, and various modifications can be made as long as the same functions can be achieved.

In the above, the DS1 direction in which the pattern of the first pupil enlargement grating 53 is inclined is a direction rotated by 45° in the clockwise direction with respect to the +X direction. However, the DS1 direction is not limited to this direction rotated by 45° in the clockwise direction with respect to the +X direction.

In the above, the first incident diffraction grating 521 and the first pupil enlargement grating 531 are provided on the +Z side, which is one side of the light guide member 51. The first emission diffraction grating 541 is provided on the −Z side, which is the other side of the light guide member 51. However, the arrangements of these light guide members 51 can be swapped with respect to the +Z direction.

In the above, the virtual image display apparatus 100 and the like are described to be usable for HMDs. However, this should not be construed in a limiting sense, and the device and the like are applicable to various optical device. For example, the disclosure of the present application is applicable to a Head-Up Display (HUD) for example.

Furthermore, in the above description, a see-through type virtual image display apparatus with which a virtual image is overlapped with an image of the outside world (real object) to be visible. However, this should not be construed in a limiting sense, and the present disclosure is applicable to a closed type virtual reality viewing device.

A virtual image display apparatus according to a specific aspect includes: a first display element configured to emit first image light, a second display element configured to emit second image light, a first optical member includes a first incident diffraction grating on which the first image light from the first display element is incident, a first emission diffraction grating configured to emit the incident first image light toward a position where an exit pupil is formed, and a first pupil enlargement grating configured to diffract the first image light from the first incident diffraction grating toward the first emission diffraction grating, and a second optical member including a second incident diffraction grating on which the second image light from the second display element is incident, a second emission diffraction grating configured to emit the incident second image light toward the position where the exit pupil is formed, and a second pupil enlargement grating configured to diffract the second image light from the second incident diffraction grating toward the second emission diffraction grating, wherein as viewed from the exit pupil, the first emission diffraction grating overlaps with the second emission diffraction grating and a region, of the first emission diffraction grating, emitting the first image light is different from a region, of the second emission diffraction grating, emitting the second image light.

In the virtual image display apparatus described above, as viewed from the exit pupil, the first emission diffraction grating and the second emission diffraction grating overlap, and the region, of the first emission diffraction grating, emitting the first image light is different from the region, of the second emission diffraction grating, emitting the second image light. As a result, an optical path from the first display element to the first emission diffraction grating can be prevented from being largely different from an optical path from the second display element to the second emission diffraction grating. Thus, unevenness in luminance in a virtual image displayed due to an increased difference in luminance between the first image light emitted from the first emission diffraction grating and the second image light emitted from the second emission diffraction grating can be suppressed.

According to a specific aspect, an incident angle of the first image light incident on the first incident diffraction grating is different from an incident angle of the second image light incident on the second incident diffraction grating. In this case, the first incident diffraction grating and the second incident diffraction grating cover different incident angles, and thus cover different angle of view range.

In a specific aspect, the second emission diffraction grating causes the second image light to pass through the first emission diffraction grating and to be emitted toward the position where the exit pupil is formed.

In a specific aspect, the second incident diffraction grating is provided to the second optical member, so as to overlap with the first pupil enlargement grating as viewed from the exit pupil.

In a specific aspect, the virtual image display apparatus further includes, between the second incident diffraction grating and the first pupil enlargement grating, a first light shielding member configured to block the second image light. With this configuration, transmission of light between the first optical member and the second optical member can be prevented, whereby the production of stray light can be suppressed.

In a specific aspect, a relative position where the first pupil enlargement grating is provided in the first optical member is different from a relative position where the second pupil enlargement grating is provided in the second optical member.

In a specific aspect, an grating pitch of the first incident diffraction grating is larger than an grating pitch of the second incident diffraction grating, and an angle of diffraction by the first incident diffraction grating for the first image light is smaller than an angle of diffraction by the second incident diffraction grating for the second image. With this configuration, the propagation angle for the light guide by the first optical member, and the propagation angle for the light guide by the second optical member can be close, so that light guide, pupil enlargement, and light extraction can be efficiently performed.

In a specific aspect, the first optical member includes, on one side, each of the first incident diffraction grating and the first pupil enlargement grating, and, on another side opposite to the one side, the first emission diffraction grating.

In a specific aspect, the first incident diffraction grating diffracts image light including a first wavelength region in the first image light, and the virtual image display apparatus further includes a second wavelength optical member including: a long wavelength incident diffraction grating configured to diffract image light including a second wavelength region on a longer wavelength side than the first wavelength region in the first image light, a long wavelength emission diffraction grating configured to emit the incident image light including the second wavelength region toward the position where the exit pupil is formed, and a long wavelength pupil enlargement grating configured to diffract the image light including the second wavelength region from the long wavelength incident diffraction grating to the long wavelength emission diffraction grating. With this configuration, in a case where a plurality of colors are displayed, the diffraction angle and diffraction efficiency can be set to be suitable for each of the colors, so that unevenness in color can be suppressed.

In a specific aspect, a height of the first incident diffraction grating is lower than a height of the long wavelength incident diffraction grating. With this configuration, the first incident diffraction grating is suitable for diffraction for relatively short wavelengths, whereby the light usage efficiency can be improved.

In a specific aspect, the second wavelength optical member is provided between the first optical member and the second optical member. With this configuration, the first optical member and the second wavelength optical member are arranged close to each other, whereby the suppression of the unevenness in color is facilitated.

In a specific aspect, the virtual image display apparatus further includes a third display element configured to emit third image light, and a fourth display element configured to emit fourth image light. The first optical member includes: the third incident diffraction grating on which the third image light from the third display element is incident, and a third pupil enlargement grating configured to diffract the third image light from the third incident diffraction grating toward the first emission diffraction grating, and the second optical member includes: the fourth incident diffraction grating on which the fourth image light from the fourth display element is incident, and a fourth pupil enlargement grating configured to diffract the fourth image light from the fourth incident diffraction grating toward the second emission diffraction grating. With this configuration, the third image light incident on the first emission diffraction grating through the third incident diffraction grating and the third pupil enlargement grating to be extracted and the first image light incident on the first emission diffraction grating through the first incident diffraction grating and the first pupil enlargement grating to be extracted complement each other for the angle of view. The fourth image light incident on the second emission diffraction grating through the fourth incident diffraction grating and the fourth pupil enlargement grating to be extracted and the second image light incident on the second emission diffraction grating through the second incident diffraction grating and the second pupil enlargement grating to be extracted complement each other for the angle of view. Thus, in the direction in which the first incident diffraction grating and the third incident diffraction grating are arranged, the ranges of direction angle covered by these incident diffraction gratings and the like can be made relatively small. Furthermore, in the direction in which the second incident diffraction grating and the fourth incident diffraction grating are arranged, the ranges of direction angle covered by these incident diffraction gratings and the like can be made relatively small. As a result, occurrence of a difference in brightness in a virtual image can be more reliably suppressed.

In a specific aspect, the fourth incident diffraction grating is provided in the second optical member so as to overlap with the third pupil enlargement grating as viewed from the exit pupil, and the virtual image display apparatus further includes, between the fourth incident diffraction grating and the third pupil enlargement grating, a second light shielding member that blocks the fourth image light. With this configuration, transmission of light between the first optical member and the second optical member can be prevented, whereby the production of stray light can be suppressed.

In a specific aspect, a pitch of the first incident diffraction grating is same as a pitch of the third incident diffraction grating, and a pitch of the second incident diffraction grating is same as a pitch of the fourth incident diffraction grating. With this configuration, with the first image light and the third image light with the matching diffraction condition are guided to the first emission diffraction grating, and the second image light and the fourth image light with the matching diffraction condition are guided to the second emission diffraction grating.

What is claimed is:

1. A virtual image display apparatus comprising:
    a first display panel that emits a first image light;
    a second display panel that emits a second image light;
    a first optical member that includes:
        a first incident diffraction grating on which the first image light from the first display panel is incident;
        a first emission diffraction grating having a first region that emits the first image light toward a position where an exit pupil is formed; and
        a first pupil enlargement grating diffracting the first image light from the first incident diffraction grating toward the first emission diffraction grating; and
    a second optical member that includes:
        a second incident diffraction grating on which the second image light from the second display panel is incident;
        a second emission diffraction grating having a second region that emits the second image light toward the position where the exit pupil is formed; and
        a second pupil enlargement grating diffracting the second image light from the second incident diffraction grating toward the second emission diffraction grating, wherein
    the first display panel is different from the second display panel,
    the first optical member is different from the second optical member,
    as viewed from the exit pupil, the first emission diffraction grating overlaps with the second emission diffraction grating,
    as viewed from the exit pupil, the first region of the first emission diffraction grating is different from the second region of the second emission diffraction grating, and
    as viewed from the exit pupil, a part of the first region of the first emission diffraction grating overlaps with the second region of the second emission diffraction grating, and another part of the first region of the first emission diffraction grating does not overlap with the second region of the second emission diffraction grating.

2. The virtual image display apparatus according to claim 1, wherein an incident angle of the first image light incident on the first incident diffraction grating is different from an incident angle of the second image light incident on the second incident diffraction grating.

3. The virtual image display apparatus according to claim 1, wherein the second emission diffraction grating causes the second image light to pass through the first emission diffraction grating and to be emitted toward the position where the exit pupil is formed.

4. The virtual image display apparatus according to claim 1, wherein the second incident diffraction grating is provided to the second optical member, so as to overlap with the first pupil enlargement grating as viewed from the exit pupil.

5. The virtual image display apparatus according to claim 4, comprising, between the second incident diffraction grating and the first pupil enlargement grating, a first light shielding member configured to block the second image light.

6. The virtual image display apparatus according to claim 1, wherein a relative position where the first pupil enlargement grating is provided in the first optical member is different from a relative position where the second pupil enlargement grating is provided in the second optical member.

7. The virtual image display apparatus according to claim 1, wherein an grating pitch of the first incident diffraction grating is larger than an grating pitch of the second incident diffraction grating, and an angle of diffraction by the first incident diffraction grating for the first image light is smaller than an angle of diffraction by the second incident diffraction grating for the second image light.

8. The virtual image display apparatus according to claim 1, wherein the first optical member includes, on one side, each of the first incident diffraction grating and the first pupil enlargement grating, and, on another side opposite to the one side, the first emission diffraction grating.

9. The virtual image display apparatus according to claim 1, wherein the first incident diffraction grating diffracts image light including a first wavelength region in the first image light, and
    the virtual image display apparatus comprises a second wavelength optical member including: a long wavelength incident diffraction grating configured to diffract image light including a second wavelength region on a longer wavelength side than the first wavelength region in the first image light; a long wavelength emission diffraction grating configured to emit the incident image light including the second wavelength region toward the position where the exit pupil is formed; and a long wavelength pupil enlargement grating configured to diffract the image light including the second wavelength region from the long wavelength incident diffraction grating toward the long wavelength emission diffraction grating.

10. The virtual image display apparatus according to claim 9, wherein the second wavelength optical member is provided between the first optical member and the second optical member.

11. The virtual image display apparatus according to claim 1, further comprising:
a third display element that emits a third image light; and
a fourth display element that emits a fourth image light, wherein
the first optical member includes:
a third incident diffraction grating on which the third image light from the third display element is incident; and
a third pupil enlargement grating diffracting the third image light from the third incident diffraction grating toward the first emission diffraction grating, and
the second optical member includes:
a fourth incident diffraction grating on which the fourth image light from the fourth display element is incident; and
a fourth pupil enlargement grating diffracting the fourth image light from the fourth incident diffraction grating toward the second emission diffraction grating.

12. The virtual image display apparatus according to claim 11, wherein
the fourth incident diffraction grating is provided in the second optical member so as to overlap with the third pupil enlargement grating as viewed from the exit pupil, and
the virtual image display apparatus comprises, between the fourth incident diffraction grating and the third pupil enlargement grating, a second light shielding member that blocks the fourth image light.

13. The virtual image display apparatus according to claim 11, wherein a pitch of the first incident diffraction grating is same as a pitch of the third incident diffraction grating, and
a pitch of the second incident diffraction grating is same as a pitch of the fourth incident diffraction grating.

14. The virtual image display apparatus according to claim 1, wherein an optical axis of the second display panel is inclined with respect to an optical axis of the first display panel.

* * * * *